United States Patent
Sung et al.

(10) Patent No.: US 8,196,636 B2
(45) Date of Patent: Jun. 12, 2012

(54) 3-DIMENSIONAL CURVED SUBSTRATE LAMINATION

(75) Inventors: Kuo-Hua Sung, San Jose, CA (US);
Troy J. Edwards, San Jose, CA (US);
Casey J. Feinstein, San Jose, CA (US);
John Z. Zhong, Cupertino, CA (US);
Steven Porter Hotelling, Los Gatos, CA (US); Andrew David Lauder, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/842,905

(22) Filed: Jul. 23, 2010

(65) Prior Publication Data
US 2010/0282416 A1 Nov. 11, 2010

Related U.S. Application Data

(62) Division of application No. 12/237,281, filed on Sep. 24, 2008, now Pat. No. 8,123,894.

(60) Provisional application No. 61/126,864, filed on May 7, 2008, provisional application No. 61/078,325, filed on Jul. 3, 2008.

(51) Int. Cl.
*B29C 65/02* (2006.01)
(52) U.S. Cl. ............... 156/579; 156/87; 156/99
(58) Field of Classification Search .......... 156/87, 156/99, 579
See application file for complete search history.

(56) References Cited

U.S. PATENT DOCUMENTS

| | | | |
|---|---|---|---|
| 2,606,853 A * | 8/1952 | Reese et al. | 156/99 |
| 3,846,221 A * | 11/1974 | Golec | 100/295 |
| 4,564,408 A * | 1/1986 | Crumbach et al. | 156/212 |
| 4,927,479 A * | 5/1990 | Bock | 156/228 |
| 5,250,146 A * | 10/1993 | Horvath | 156/581 |
| 5,483,261 A | 1/1996 | Yasutake | |
| 5,488,204 A | 1/1996 | Mead et al. | |
| 5,494,546 A * | 2/1996 | Horvath | 156/102 |
| 5,733,410 A | 3/1998 | Gore et al. | |
| 5,825,352 A | 10/1998 | Bisset et al. | |
| 5,835,079 A | 11/1998 | Shieh | |

(Continued)

FOREIGN PATENT DOCUMENTS
DE 100 52 293 A1 4/2002
(Continued)

OTHER PUBLICATIONS

International Search Report mailed Dec. 3, 2009, for PCT Application No. PCT/US2009/041850, filed Apr. 27, 2009, five pages.

(Continued)

*Primary Examiner* — Khanh P Nguyen
*Assistant Examiner* — Vishal I Patel
(74) *Attorney, Agent, or Firm* — Morrison & Foerster LLP

(57) ABSTRACT

A method of laminating a surface of a flexible material to a surface of a rigid, curved material. The method includes pressing an area of the surface of the flexible material into the surface of the rigid, curved material with a holder to create a contact area while the flexible material is conformed to the holder, which has a curvature greater than a curvature of the rigid, curved material surface; and changing the contact area between the surface of the flexible material and the surface of the rigid, curved material while maintaining pressure on the contact area until the surface of the flexible material and the surface of the rigid curved material are laminated.

17 Claims, 22 Drawing Sheets

U.S. PATENT DOCUMENTS

| | | | |
|---|---|---|---|
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,311,399 | B1 * | 11/2001 | Steelman et al. ............... 30/366 |
| 6,323,846 | B1 | 11/2001 | Westerman et al. |
| 6,690,387 | B2 | 2/2004 | Zimmerman et al. |
| 6,706,403 | B1 | 3/2004 | Olofson et al. |
| 6,841,027 | B2 | 1/2005 | Muffler |
| 7,015,894 | B2 | 3/2006 | Morohoshi |
| 7,144,464 | B2 | 12/2006 | Teschner et al. |
| 7,184,064 | B2 | 2/2007 | Zimmerman et al. |
| 7,306,690 | B2 | 12/2007 | Hodsdon et al. |
| 7,663,607 | B2 | 2/2010 | Hotelling et al. |
| 2002/0062921 | A1 | 5/2002 | Muffler |
| 2004/0154730 | A1 | 8/2004 | Clingman et al. |
| 2004/0231778 | A1 | 11/2004 | Teschner et al. |
| 2005/0250870 | A1 * | 11/2005 | Jallouli ........................ 522/182 |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2009/0277578 | A1 | 11/2009 | Sung et al. |

FOREIGN PATENT DOCUMENTS

| | | | |
|---|---|---|---|
| EP | 1 479 515 | A2 | 11/2004 |
| EP | 1 479 515 | A3 | 11/2004 |
| JP | 2000-163031 | A | 6/2000 |
| JP | 2002-342033 | A | 11/2002 |
| WO | WO-2009/137290 | A2 | 11/2009 |
| WO | WO-2009/137290 | A3 | 11/2009 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Mar. 30, 2011, for U.S. Appl. No. 12/237,281, filed Sep. 24, 2008, 12 pages.

\* cited by examiner t = 0 t = 1 t = 2 t = 0 t = 1 t = 2 t = 3 t = 4 t = 5

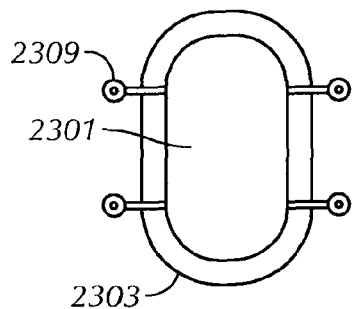
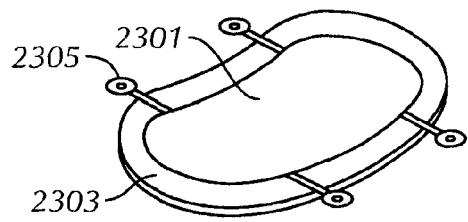
FIG. 23A          FIG. 23B
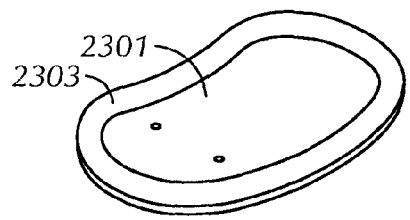
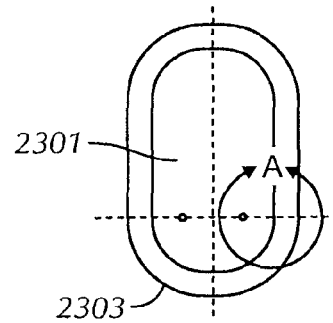
FIG. 24A          FIG. 24B
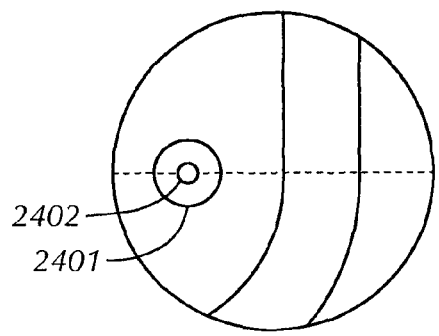
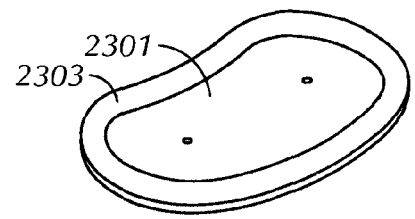
FIG. 24C          FIG. 25

3-DIMENSIONAL CURVED SUBSTRATE LAMINATION

CROSS REFERENCE TO RELATED APPLICATIONS

This application is a divisional of U.S. patent application Ser. No. 12/237,281, filed on Sep. 24, 2008, which claims priority to U.S. Provisional Patent Application Nos. 61/126,864 filed on May 7, 2008 and 61/078,325 filed on Jul. 3, 2008, the entire disclosures of which are incorporated herein by reference.

FIELD OF THE INVENTION

This invention relates to lamination of flexible or rigid materials, and more particularly, to lamination of materials to a curved, rigid substrate.

BACKGROUND OF THE INVENTION

Conventional lamination processes are adequate for laminating a substantially flat/planar material to a substantially flat/planar substrate. For example, in the field of electronic devices, many conventional methods exist to laminate a planar printed circuit board to a planar substrate, such as another planar printed circuit board, to form a single, laminated circuit board. However, conventional techniques may not work when the substrate is substantially curved.

SUMMARY OF THE INVENTION

Laminating a flexible material to a curved substrate can pose several difficulties, particularly when the process is applied in the field of electronic devices. For example, it may be more difficult to prevent air bubbles from getting trapped between a flexible material and a curved substrate during lamination than between rigid straight material. In some electronics applications, for example, laminates must meet strict quality requirements that limit the number and/or size of trapped air bubbles. If a laminate has too many trapped air bubbles, or if the air bubbles are too large, the laminate must often be discarded as defective, resulting in lost time and money. Even if the adhesive used in the defective laminate can be reworked to reduce trapped bubbles, the re-lamination process would still result in lost time. In addition, the materials used in the laminates of some electronic devices can be relatively delicate. This limits the maximum pressure that can be applied during lamination.

In one embodiment of the invention, a lamination system includes a base and an upper portion. The base includes a lower holder. The upper portion includes an upper holder and control circuitry. The lower holder includes a lower contact surface that is placed in contact with a non-lamination surface of a substrate, such as the non-lamination surface of the substrate. The upper holder includes an upper contact surface that is placed in contact with a non-lamination surface of a flexible material, such as the non-lamination surface of the flexible material. The lower holder and the upper holder may each be mounted to a motion block. The lower and upper motion blocks can provide various types of motion to the holders ranging from single axis motion to fully articulated motion, depending on the requirement of the particular lamination system. Different embodiments of the disclosed lamination system are described in more detail below.

During the lamination process, the lamination surfaces are brought together with an adhesive material in between. Various types of adhesives can be used, including pressure-sensitive adhesives (PSAs), re-workable PSAs, thermoplastic film, thermoset film, thermal cure liquid (single or multiple components), ultraviolet (UV) cure liquid, and multiple-component adhesives that cure at room temperature. The adhesive(s) may be applied to the substrate, the flexible material, or both. In addition, the adhesive(s) may be applied as a sheet or sheets, and/or one or more regions of liquid adhesive. As the lamination surfaces are brought into contact, a force-applying area of the upper contact surface and a force-applying area of the lower contact surface apply opposing forces to press together the substrate and the flexible material in a pressure region between the upper and lower force-applying areas. The portions of the substrate and the flexible material in the pressure region are pressed together and laminated with the adhesive material. Either or both of the lower holder and the upper holder may be heated to improve adhesive properties. Lamination may also be performed at or below room temperature.

In another embodiment, a lower holder is a base chuck formed of a rigid material, such as glass or a metal. The lower holder has a lower contact surface that is shaped to conform to a non-lamination surface of a curved substrate. An upper holder is a vacuum chuck formed of a compliant material, such as rubber. The upper holder has an upper contact surface with vacuum holes (not shown) to hold a non-lamination surface of a flexible printed circuit board (PCB) in place on the upper contact surface. Thus, flexible PCB is forced into the shape of upper contact surface. In one embodiment, the upper contact surface initially has a higher curvature than the lower contact surface.

During an early stage of a lamination process, the upper holder is moved along a z-axis direction towards the lower holder, causing a lamination surface of flexible PCB to contact a lamination surface of curved substrate initially at a single-point, causing the lamination surfaces to be pressed together in a pressure region between force-applying areas of the upper contact surface and the lower contact surface, respectively. As the lamination process continues, the upper holder is pressed further in the z-direction, against the lower holder. The increasing pressure causes the size of the pressure region to grow larger.

During a latter part of the lamination process, after upper holder has been moved further along the z-axis towards lower holder. Because upper holder is made of a compliant material, the motion has caused the upper holder to deform. Now, the contact area between the lamination surface of the PCB and the lamination surface of the curved substrate becomes greater than it was during the early stage of the lamination process. The larger contact area causes the lamination surfaces to be pressed against each other in a larger pressure region between larger force-applying areas of the upper contact surface and the lower contact surface, respectively. In this embodiment, the process continues until the pressure region expands to cover the entire lamination surfaces.

Because the pressure region begins as a single point and expands from that point during the lamination process, surrounding air may be less likely to become trapped between the flexible PCB and curved substrate as a result of air being pushed out and away from the center as the process continues. Therefore, the lamination system according to this embodiment may potentially reduce or eliminate the formation of air bubbles caused during lamination. In addition, because the upper holder is formed of a compliant material, the present example embodiment may be better-suited for lamination of relatively delicate materials.

BRIEF DESCRIPTION OF THE DRAWINGS

FIGS. 23A-B, 24A-C, and 25 illustrate various exemplary alignment structures that can be used to help align a flexible material according to embodiments of the invention.

DETAILED DESCRIPTION OF THE PREFERRED EMBODIMENT

In the following description of preferred embodiments, reference is made to the accompanying drawings, in which it is shown by way of illustration specific embodiments in which the invention can be practiced. It is to be understood that other embodiments can be used and structural changes can be made without departing from the scope of the embodiments of this invention.

For the sake of clarity, many of the figures do not show an adhesive used in the lamination processes described below. However, it is understood that an adhesive or other approach that allows the fixing together of two materials may be used in these processes.

The present disclosure relates to apparatus and methods for laminating a rigid or flexible material to a curved substrate.

Figure 1A:
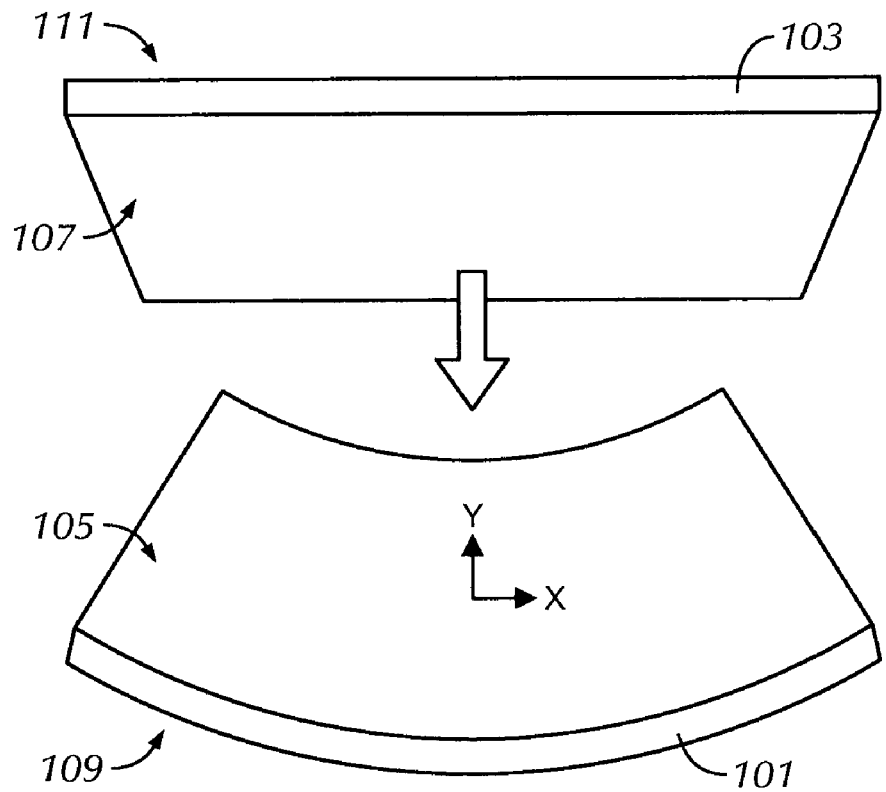
FIG. 1A illustrates examples of a curved substrate and a flexible material according to embodiments of the invention.
Figure 1B:
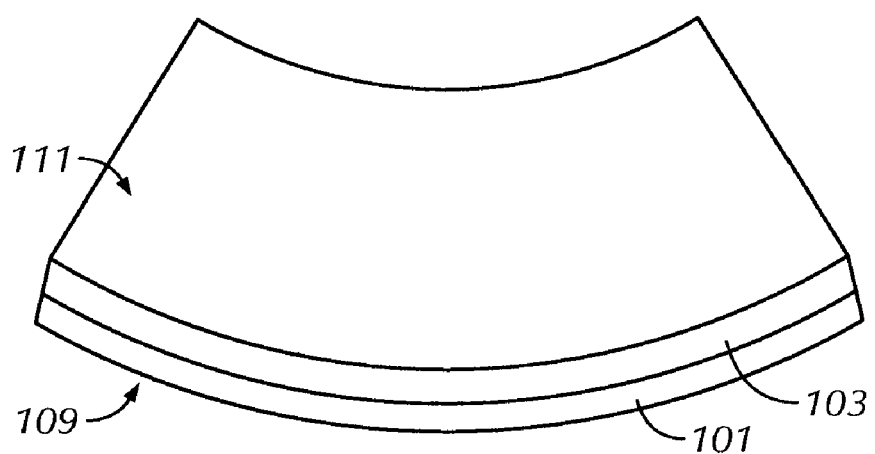
FIG. 1B illustrates the curved substrate and the flexible material of FIG. 1A laminated together according to embodiments of the invention.

FIGS. 1A and 1B are perspective drawings illustrating examples of a curved substrate 101 and a flexible material 103 that may be laminated together according to embodiments of the invention. In particular, FIG. 1A shows the substrate 101 and the flexible material 103 before lamination. As illustrated, the substrate 101 and the flexible material 103 have lamination surfaces 105 and 107, respectively, adapted to be laminated together. The substrate 101 and the flexible material 103 also have non-lamination surfaces 109 and 111, respectively, that are opposite the lamination surfaces. In this embodiment, the substrate 101 may be a glass plate that is curved along more than one axis, i.e., multi-axis curvature. Other substrates suitable for lamination may include plastics, ceramics, and other materials. As illustrated in FIG. 1A, substrate 101 is curved in both the x-axis and the y-axis. A closer view of the curvature of substrate 101 is provided in FIGS. 2A and 2B.

FIG. 1B shows the substrate 101 and the flexible material 103 having their respective lamination surfaces (not shown) fixed together as a result of the lamination process.

Figure 2A:
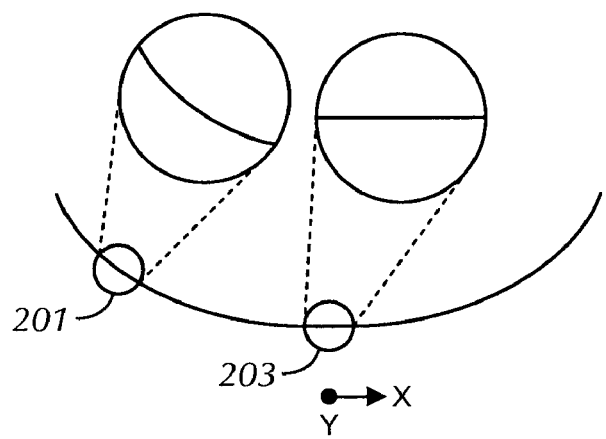
FIGS. 2A and 2B are cross-sectional views showing details of the curvature of the substrate in the y-direction and the x-direction, respectively, according to embodiments of the invention.
Figure 2B:
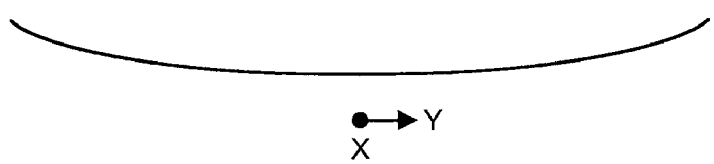

FIGS. 2A and 2B are cross-sectional views showing details of the curvature of the substrate 101 in the y-direction and the x-direction, respectively. The degree of curvature in each axis may or may not be the same. In this embodiment, the figures show that the curvature of the substrate 101 along the y-axis is generally greater than the curvature along the x-axis. In addition, the curvature of the substrate 101 can vary along an axis. For example, FIG. 2A shows a portion 201 nearer to an edge of the substrate 101 along the y-axis and a portion 203 nearer to the center of the substrate 101 along the y-axis. Portions 201 and 203 are magnified to illustrate that the curvature of portion 201 is greater than the curvature of portion 203. In other words, the substrate 101 is straighter near its center than at its edges.

Referring again to FIG. 1A, in this embodiment, flexible material 103 is a substantially planar circuit board. In particular, the circuit board is formed by, for example, depositing circuit elements, such as resistors, capacitors, transistors, and/or conductive traces (e.g., wires) onto a flexible board substrate. An insulating layer can be deposited over the circuit elements to protect against environmental elements such as moisture, as well as to provide a smoother surface for lamination. However, the surface of the insulating material may not be perfectly smooth. In other embodiments, the flexible material 103 may be an optically transparent material, such as a plastic with patterned indium tin oxide (ITO).

Figure 3:
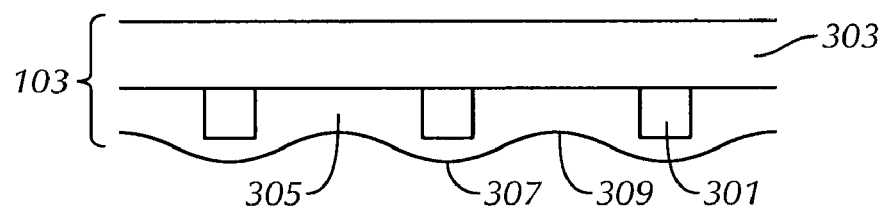
FIG. 3 is a more detailed, cross-sectional view of a portion of the flexible material according to embodiments of the invention.

FIG. 3 is a more detailed, cross-sectional view of a portion of the flexible material 103. FIG. 3 shows conductive traces 301 on a flexible board substrate 303, and an insulating layer 305 deposited over the conductive traces 301. Because the conductive traces 301 protrude from the surface of the board substrate 303, the surface of the insulating layer 305 has "peaks" 307 over the conductive traces 301 and "valleys" 309 between the conductive traces 301. Therefore, the surface insulating layer 305, which is the lamination surface 307 in this embodiment, is not perfectly smooth.

The flexible material 103 need not be a continuous sheet, and may have cutouts, slits, or other characteristics that allow the flexible material 103 to be conformed to a curved surface. FIGS. 4A-4E illustrates various forms of the flexible materials 103, such as flexible circuit boards, and curved surfaces.

Figure 4A:
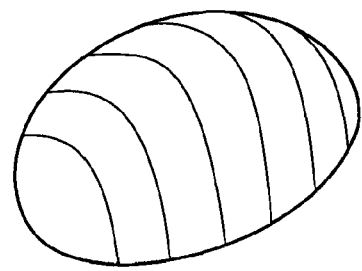
FIG. 4A illustrates an exemplary curved surface for a sensor array according to embodiments of this invention.

FIG. 4A illustrates an exemplary curved surface for a sensor array according to embodiments of this invention. A typical flex circuit sensor array applied to the inside of this surface may tend to wrinkle, buckle, or snap.

Figure 4B:
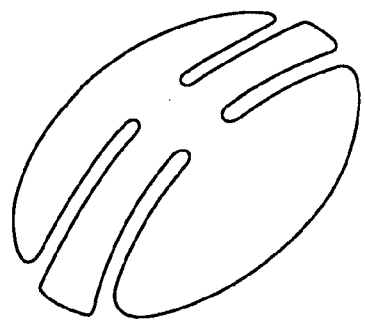
FIG. 4B illustrates an exemplary "butterfly" pattern for a sensor array according to embodiments of this invention.

FIG. 4B illustrates an exemplary "butterfly" pattern for a sensor array according to another embodiment of the invention. This pattern can be formed using a flat array and applied to a curved surface without wrinkling.

Figure 4C:
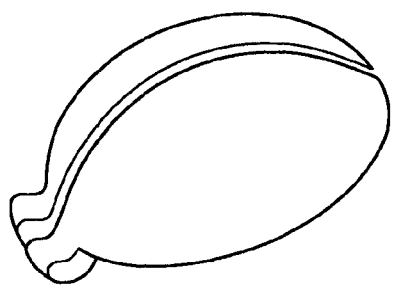
FIG. 4C illustrates an exemplary two-strip sensor array pattern according to embodiments of this invention.

FIG. 4C illustrates an exemplary two strip sensor array pattern according to yet another embodiment of this invention.

Figure 4D:
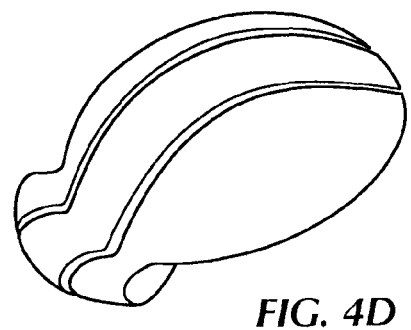
FIG. 4D illustrates an exemplary three-strip sensor array pattern according to embodiments of this invention.

FIG. 4D illustrates an exemplary three strip sensor array pattern according to yet another embodiment of this invention. Both patterns shown in FIGS. 4C and 4D can also be formed from a flat array and applied to a curved surface.

Figure 4E:
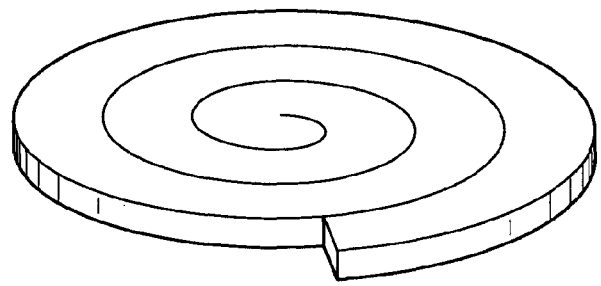
FIG. 4E illustrates an exemplary flat sensor pattern in a "snail" pattern that can be applied to a curved surface according to embodiments of this invention.

FIG. 4E illustrates an exemplary flat sensor pattern in a "snail" pattern that can be applied to a curved surface according to yet another embodiment of this invention.

The above-described curved or three-dimensional shaped sensor patterns in FIGS. 4A-4E may be placed under or over a curved substrate, for example, a glass or plastic cover. These sensors patterns can be used in a variety of multi-touch devices, for example a multi-touch mouse.

In another embodiment, the sensor array can be formed on a thermal plastic substrate material that can be reformed with heat. In this configuration the sensor array may be draped across a mold and then heated to form a curved sensor array shape. Alternatively, the substrate may be vacuum formed inside a cavity. The traces in the array, which may for example be made out of copper, may be made flexible enough to withstand this type of reshaping.

Laminating a flexible material to a curved substrate can pose several difficulties, particularly when the process is applied in the field of electronic devices. For example, it may be more difficult to prevent air bubbles from getting trapped between a flexible material and a curved substrate during lamination than between rigid straight material. In some electronics applications, for example, laminates must meet strict quality requirements that limit the number and/or size of trapped air bubbles. If a laminate has too many trapped air bubbles, or if the air bubbles are too large, the laminate must often be discarded as defective, resulting in lost time and money. Even if the adhesive used in the defective laminate can be reworked to reduce trapped bubbles, the re-lamination process would still result in lost time.

In addition, the materials used in the laminates of some electronic devices can be relatively delicate. This limits the maximum pressure that can be applied during lamination. For instance, the substrate 101 in FIG. 1A may be glass, which is breakable under pressure. Similarly, the flexible material 103 in FIG. 1A may be a circuit board that can only sustain a limited amount of pressure to prevent damages to its circuit elements.

Figure 5:
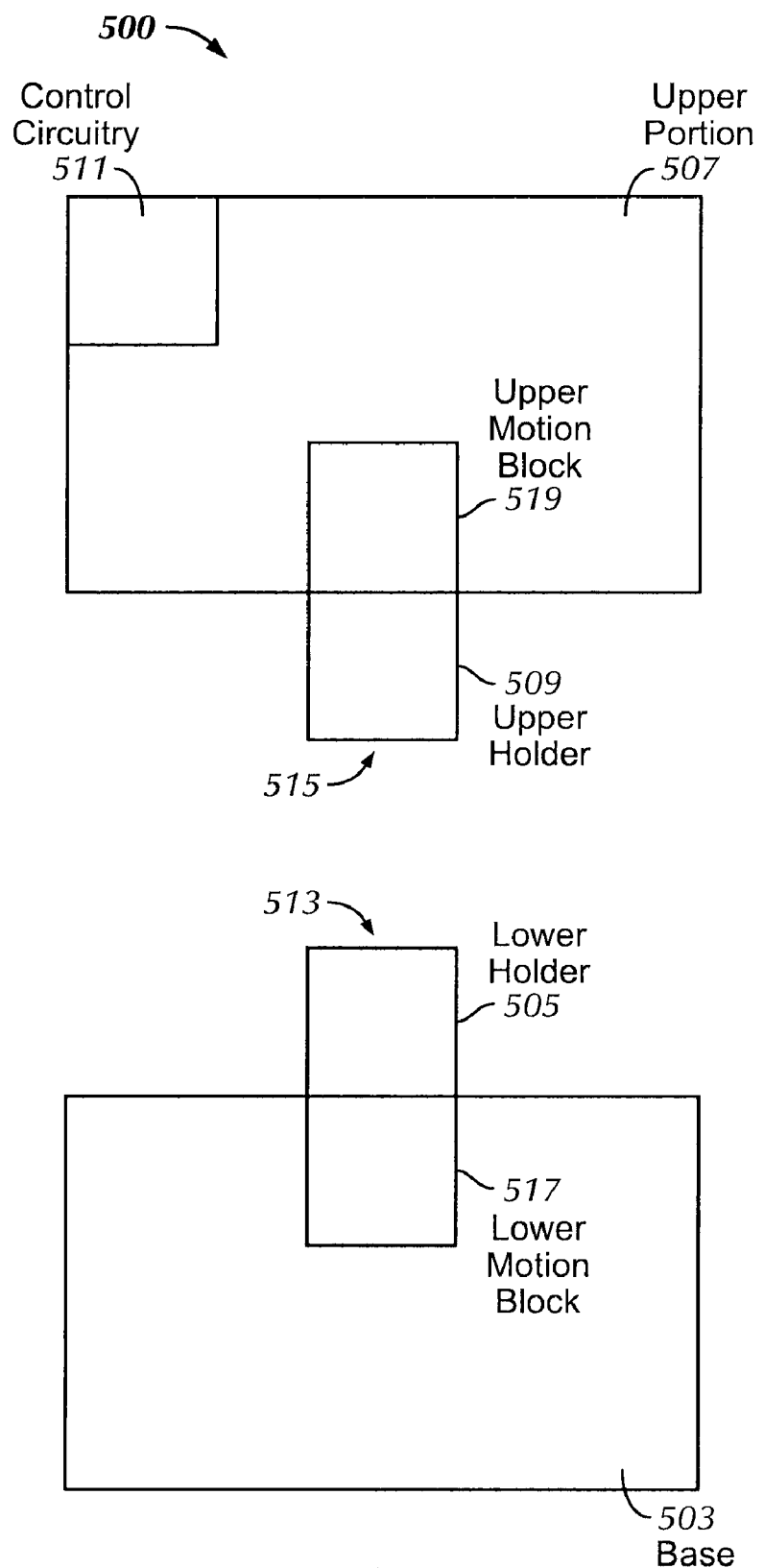
FIG. 5 illustrates an exemplary lamination system according to embodiments of the invention.

In view of the foregoing, FIG. 5 illustrates a lamination system 500 according to an embodiment of the invention. Lamination system 500 includes a base 503 and an upper portion 507. The base 503 includes a lower holder 505. The upper portion 507 includes an upper holder 509 and control circuitry 511. The lower holder 505 includes a lower contact surface 513 that is placed in contact with a non-lamination surface of a substrate, such as the non-lamination surface 109 of the substrate 101 in FIG. 1A. The upper holder 509 includes an upper contact surface 515 that is placed in contact with a non-lamination surface of a flexible material, such as the non-lamination surface 111 of the flexible material 103 of FIG. 1A. The lower holder 505 and the upper holder 509 may each be mounted to a motion block 517, 519. The lower and upper motion blocks 517, 519 can provide various types of motion to the holders ranging from single axis motion to fully articulated motion, depending on the requirement of the particular lamination system. Different embodiments of the disclosed lamination system are described in more detail below.

During the lamination process, the lamination surfaces are brought together with an adhesive material in between. Various types of adhesives can be used, including pressure-sensitive adhesives (PSAs), re-workable PSAs, thermoplastic film, thermoset film, thermal cure liquid (single or multiple components), ultraviolet (UV) cure liquid, and multiple-component adhesives that cure at room temperature. The adhesive(s) may be applied to the substrate, the flexible material, or both. In addition, the adhesive(s) may be applied as a sheet or sheets, and/or one or more regions of liquid adhesive. As the lamination surfaces are brought into contact, a force-applying area of the upper contact surface 515 and a force-applying area of the lower contact surface 513 apply opposing forces to press together the substrate and the flexible material in a pressure region between the upper and lower force-applying areas. The portions of the substrate and the flexible material in the pressure region are pressed together and laminated with the adhesive material. Either or both of the lower holder 505 and the upper holder 509 may be heated to improve adhesive properties. Lamination may also be performed at or below room temperature.

As described in more detail in the following exemplary embodiments, the upper holder 509 and the lower holder 505 may be formed such that the pressure region may change during the lamination process. For example, in some embodiments, the pressure region changes in position during the lamination process. In other embodiments, the pressure region changes in size and/or shape during the lamination process. In still other embodiments, the pressure region changes in position and in size/shape during the lamination process. In yet other embodiments, the shape and position of the pressure region remain the same. By changing position, size, shape, and/or other aspects of the pressure region, problems such as the formation of trapped air bubbles may be minimized.

Figure 6:
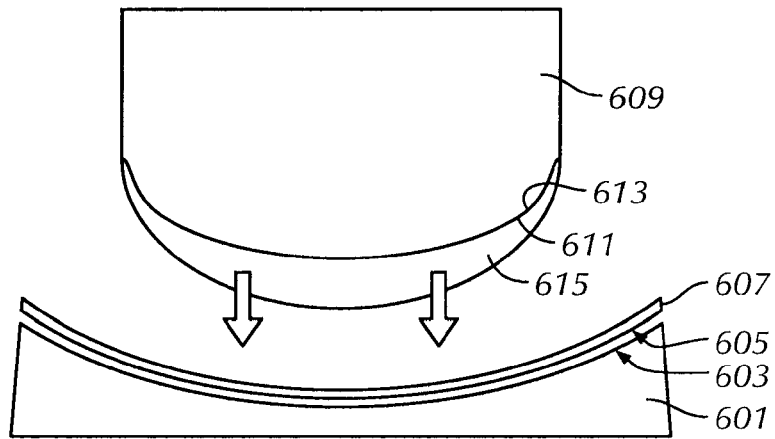
FIGS. 6-8 are cross-sectional views illustrating the operation of a lower holder and an upper holder of an exemplary lamination system according to embodiments of the invention.
Figure 7:
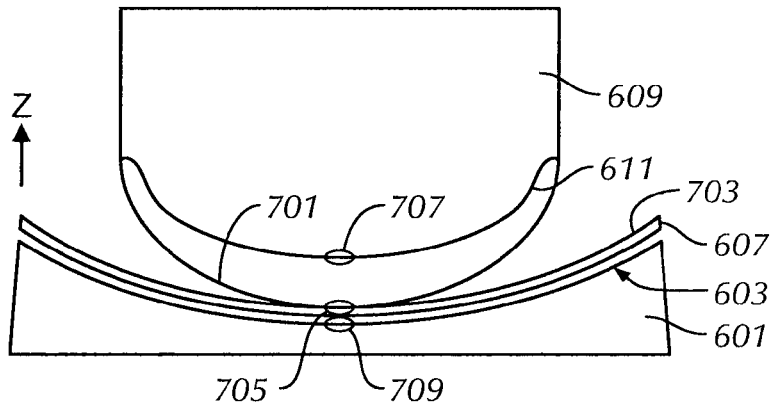
Figure 8:
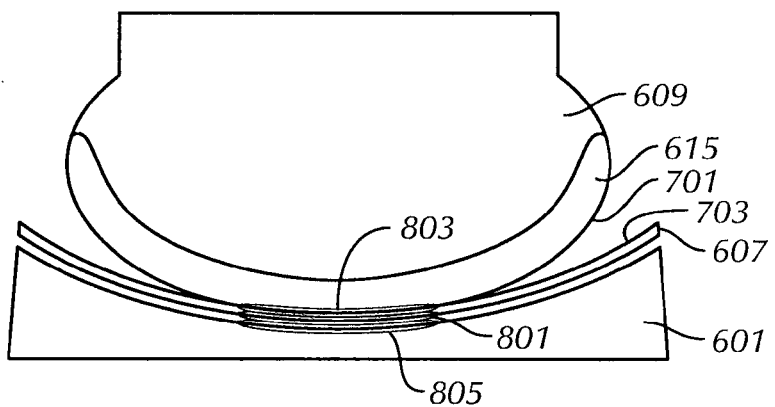

FIGS. 6-8 are cross-sectional views illustrating the operation of a lower holder and an upper holder of an embodiment of the disclosed lamination system. Referring to FIG. 6, a lower holder 601 is a base chuck formed of a rigid material, such as glass or a metal. Lower holder 601 has a lower contact surface 603 that is shaped to conform to a non-lamination surface 605 of a curved substrate 607. An upper holder 609 is a vacuum chuck formed of a compliant material, such as rubber. The upper holder 609 has an upper contact surface 611 with vacuum holes (not shown) to hold a non-lamination surface 613 of a flexible printed circuit board (PCB) 615 in place on the upper contact surface 611. Thus, flexible PCB 615 is forced into the shape of upper contact surface 611. As shown in FIG. 6, the upper contact surface 611 initially has a higher curvature than the lower contact surface 603.

FIG. 7 shows lower holder 601 and upper holder 609 during an early stage of a lamination process. Specifically, the upper holder 609 is moved along a z-axis direction towards the lower holder 601, causing a lamination surface 701 of flexible PCB 615 to contact a lamination surface 703 of curved substrate 607 initially at a single-point, causing the lamination surfaces 701 and 703 to be pressed together in a pressure region 705 between force-applying areas 707 and 709 of the upper contact surface 611 and the lower contact surface 603, respectively.

As the lamination process continues, the upper holder 609 is pressed further in the z-direction, against the lower holder 601. The increasing pressure causes the size of the pressure region 705 to grow larger.

FIG. 8 shows the lower holder 601 and the upper holder 609 during a latter part of the lamination process, after upper holder 609 has been moved further along the z-axis towards lower holder 601. Because upper holder 609 is made of a compliant material, the motion has caused the upper holder 609 to deform. Now, the contact area between the lamination surface 701 of the PCB 615 and the lamination surface 703 of the curved substrate 607 becomes greater than it was during the early stage of the lamination process shown in FIG. 7. The larger contact area causes the lamination surfaces 701, 703 to be pressed against each other in a larger pressure region 801 between larger force-applying areas 803 and 805 of the upper contact surface 611 and the lower contact surface 603, respectively. In this embodiment, the process continues until the pressure region expands to cover the entire lamination surfaces 701, 703.

Because the pressure region begins as a single point and expands from that point during the lamination process, surrounding air may be less likely to become trapped between the flexible PCB 615 and curved substrate 607 as a result of air being pushed out and away from the center as the process continues. Therefore, the lamination system according to this embodiment may potentially reduce or eliminate the formation of air bubbles caused during lamination. In addition, because the upper holder 609 is formed of a compliant material, the present example embodiment may be better-suited for lamination of relatively delicate materials.

Figure 9A:
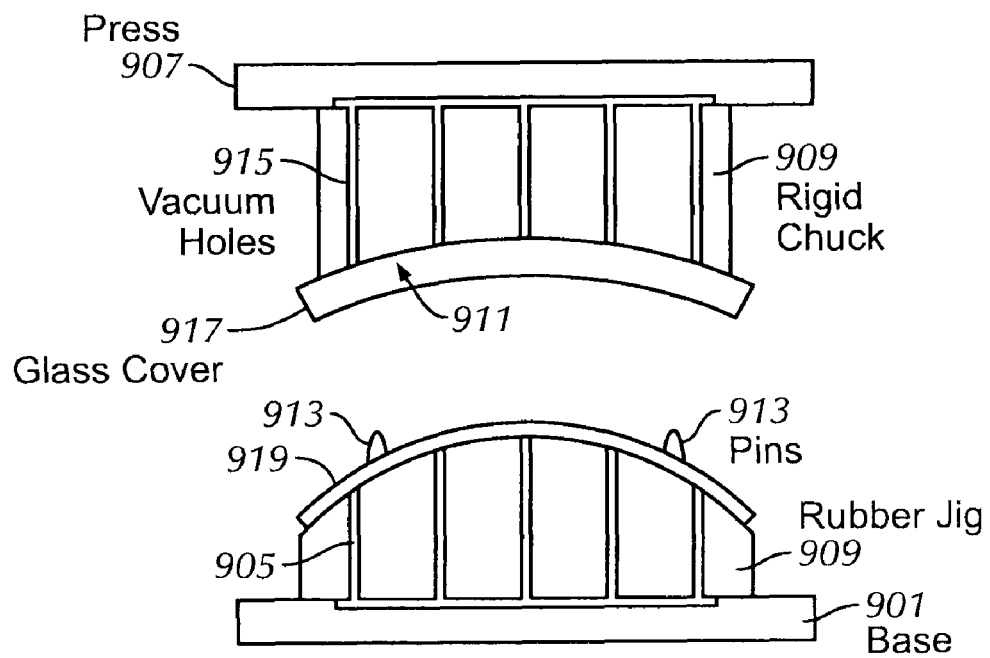
FIGS. 9A and 9B are cross-sectional views illustrating the operation of a lower holder and an upper holder of another exemplary lamination system according to embodiments of the invention.
Figure 9B:
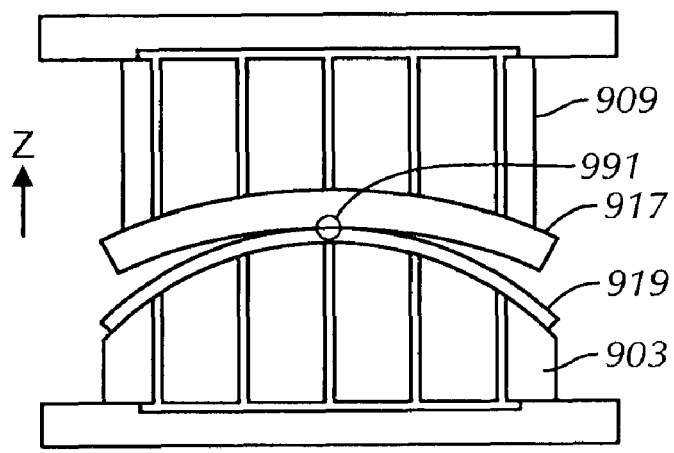

FIGS. 9A and 9B are cross-sectional views illustrating the operation of a lower holder and an upper holder of another exemplary lamination system according to embodiments of the invention. The system of FIGS. 9A and 9B is similar to the system of FIGS. 6-8. Referring to FIG. 9A, the system includes a base 901 including a lower holder 903 with a lower contact surface 905. The system also includes an upper portion, press 907, having an upper holder 909 with an upper contact surface 911. One difference between this embodiment (illustrated in FIGS. 9A and 9B) and the previous embodiment (illustrated in FIGS. 6-8) is that, in this system, the upper holder 909 is a rigid chuck and the lower holder 903 is of deformable, compliant material, such as rubber. Also, the system illustrated in FIGS. 9A and 9B includes retractable alignment pins 913 protruding from the lower holder 903, and vacuum holes 915 through both the upper and lower holders 909, 903.

In this system, a curved substrate 917 is fixed to upper contact surface 911 by positioning the substrate over vacuum holes 915 and applying a vacuum to the holes. A flexible PCB 919 is fixed to the lower holder 903 by using the vacuum holes 915 through the lower holder 903. The retractable alignment pins 913 provide a guide when positioning and fixing the flexible PCB 919 onto the lower holder 903. The vacuum holes 915 keeps the flexible PCB 919 warped over the lower holder 903 before lamination.

FIG. 9B illustrates the system of FIG. 9A during a lamination process. As in the embodiment described above, the upper holder 909 is moved along a z-axis direction towards the lower holder 903 so that the respective lamination surface of the curved substrate 917 and the flexible PCB 919 are pressed together at a pressure region that begins at a contact point 991 because the curvature of the lower holder 903 is higher than the upper holder 909. The pressure region expands as the upper holder 909 continues to be pressed against the lower holder 903 because the lower holder 903 is made of a compliant, deformable material and deforms as it receives increasing pressure. As the pressure region expands, the retractable alignment pins 913 may be retracted and the lamination surface of the curved substrate 917 can eventually be in contact with the entire area of the lamination surface of the PCB 919. Alternately, lower holder 903 may be moved toward upper holder 909 in the z-axis direction to achieve the same lamination result.

Figure 10A:
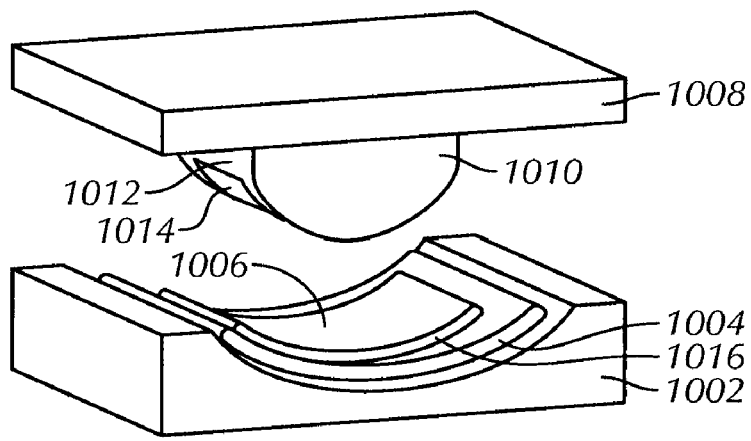
FIGS. 10A-C are cross-sectional views illustrating the operation of a lower holder and an upper holder of another exemplary lamination system according to embodiments of the invention.
Figure 10B:
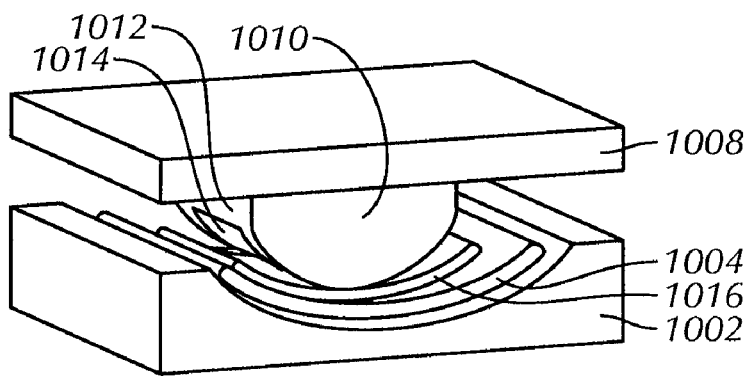
Figure 10C:
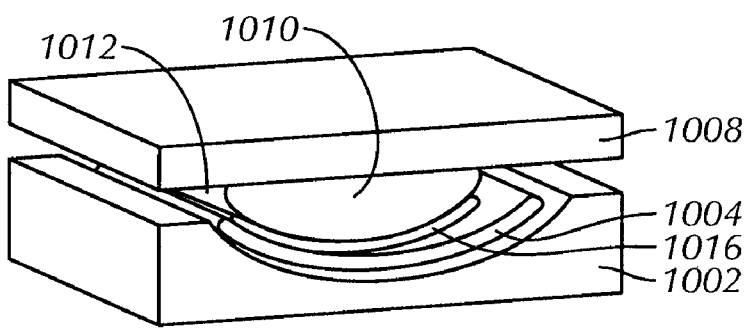

FIGS. 10A-C are cross-sectional views illustrating the operation of a lower holder and an upper holder of another exemplary lamination system according to embodiments of this invention. The system of FIGS. 10A-C is similar to the system illustrated in FIGS. 9A and 9B. Referring to FIG. 10A, the system includes a base 1002 including a lower holder 1004 with a lower contact surface 1006. A bottom substrate 1016 is held by the lower holder 1004 by a vacuum chuck (not shown) or mechanical features of the lower holder 1004. The system also includes an upper portion, for example, a press 1008. The upper portion includes an upper holder 1010. In this embodiment, the upper holder 1010 has a flexible membrane 1012 adapted to hold a top substrate 1014 in a pre-form position. In various embodiments, the top substrate 1014 may be held by a vacuum chuck (not shown) or other mechanical features of the upper holder 1010. The membrane 1012 may be a conformal material (e.g., silicone rubber) or a liquid or air filled sac.

FIGS. 10B and 10C illustrate the system of FIG. 10A during a lamination process. Referring to FIG. 10B, similar to previously disclosed embodiments, the upper holder 1010 is moved towards the lower holder 1004 so that the bottom surface of the top substrate 1014 becomes in contact with and presses against the top surface of the bottom substrate 1016. Because the curvature of the lower holder 1004 is less than the curvature of the upper holder 1010, the initial contact between the top substrate 1014 and the bottom substrate 1016 is made at the center of the top surface of the bottom substrate 1016, as a result of the movement of the upper holder 1008 towards the lower holder 1004 in the z-direction.

FIG. 10C illustrates the next stage in the lamination process. As the upper holder 1010 continues to exert pressure on the lower holder 1004 after the initial contact between the top substrate 1014 and the bottom substrate 1016, the flexible membrane 1012 of the top holder starts to deform. As a result, the initial pressure point expands from the center of the top surface of the bottom substrate 1016 towards the edges of the bottom substrate 1016 until the top substrate 1014 and the bottom substrate 1016 are completely laminated to each other, as illustrated in FIG. 10C. Because the upper holder 1010 includes a flexible membrane 1012 in this embodiment, pressure is applied evenly in all directions against the bottom substrate 1016 in the lamination process. The upper holder 1010 may also be made of other types of material that allows it to apply pressure evenly in all directions in the lamination process. Either or both of the lower holder 1004 and the upper holder 1010 may be heated to improve adhesive properties. In various embodiments, the process illustrated in FIGS. 10A-C can be applied in a reverse setup by rotating the illustrated system 180 degrees so that the lower holder is on top and the upper holder is at the bottom.

Figure 11A:
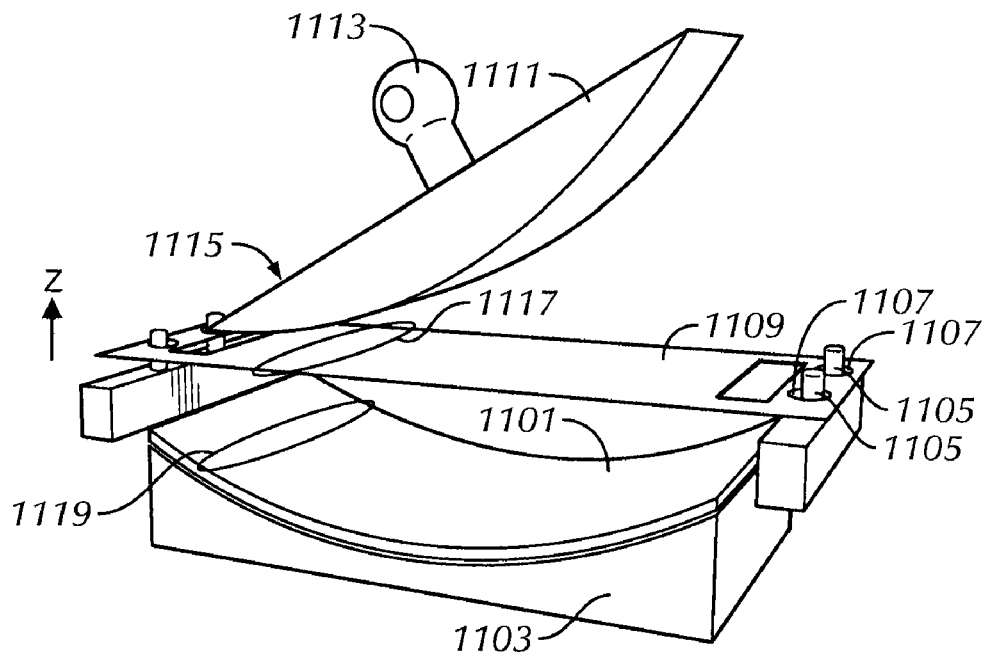
FIGS. 11A and 11B illustrate the operation of a lower holder and an upper holder of another exemplary lamination system according to embodiments of the invention.
Figure 11B:
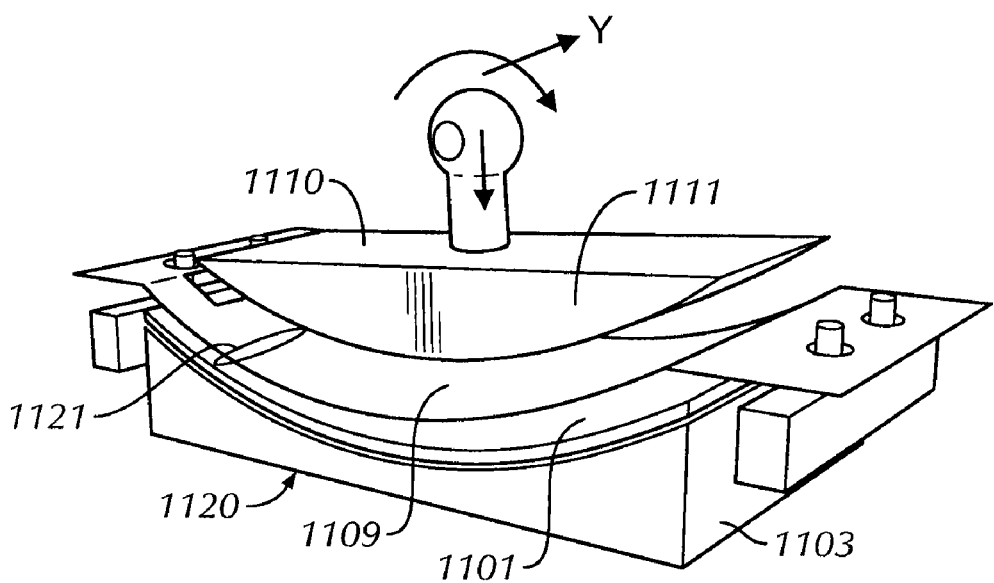

FIGS. 11A and 11B illustrate the operation of a lower holder and an upper holder of another exemplary lamination system according to embodiments of the invention. In this system, a curved substrate 1101 is placed on a lower holder 1103 that includes fixed alignment pins 1105. A flexible material 1109 is secured over the lower holder 1103 by placing the alignment holes 1107 on the flexible material 1109 over the alignment pins 1105. FIG. 11A illustrates a first stage of a lamination operation in which an upper holder 1111 is moved along the z-axis towards the lower holder 1103. The upper holder 1111 is mounted to the upper motion block 519 of FIG. 5 by a motion articulator such as a gimbal 1113 (other articulators could include ball joints, hinges or other mechanical linkage) to provide articulated motion including translational and rotational motion along multiple axes. As the upper holder 1111 approaches the lower holder 1103, a leading portion 1115 of the upper holder 1111 contacts a first area 1117 of flexible material 1109 and pushes the area 1117 towards the substrate 1101. In various embodiments, the initial contact between the leading portion 1115 and the first area 1117 of the flexible material may be at different angles. The upper holder 1111 continues moving along the z-axis until the leading portion 1115 causes the first area 1117 of the flexible material 1109 to contact a first area 1119 of the substrate 1101, creating a pressure region (not shown).

FIG. 11B illustrates a second stage of the lamination operation. The second stage begins after the first area 1117 of flexible material 1109 contacts the first area 1119 of the substrate 1101. In the second stage, the upper holder 1111 rotates about the y-axis until the top flat surface 1110 of the upper holder 1111 is parallel to the bottom flat surface 1120 of the lower holder as the upper holder 1111 moves towards the lower holder 1103 along the z-axis. This second stage motion causes the pressure region 1121 to change in size, shape, and/or position. How the pressure region 1121 changes may depend on several factors, such as the shapes and rigidity of the upper and lower holders 1111, 1103, the type and amount of force/motion applied through the gimbal 1113 during operation, and other factors.

FIGS. 12A-E each shows three top views taken along the z-axis at progressively increasing times during the second stage to illustrate the various ways in which the pressure region 1121 evolves depending on the different configurations that will now be described. In the figures, the shaded areas represent pressure region 1121. The views are taken at times t=0 (beginning of second stage, initial contact of first area 1117 and first area 1119), t=1 (approximately midway through second stage), and t=2 (approximately the end of the second stage).

Figure 12A:
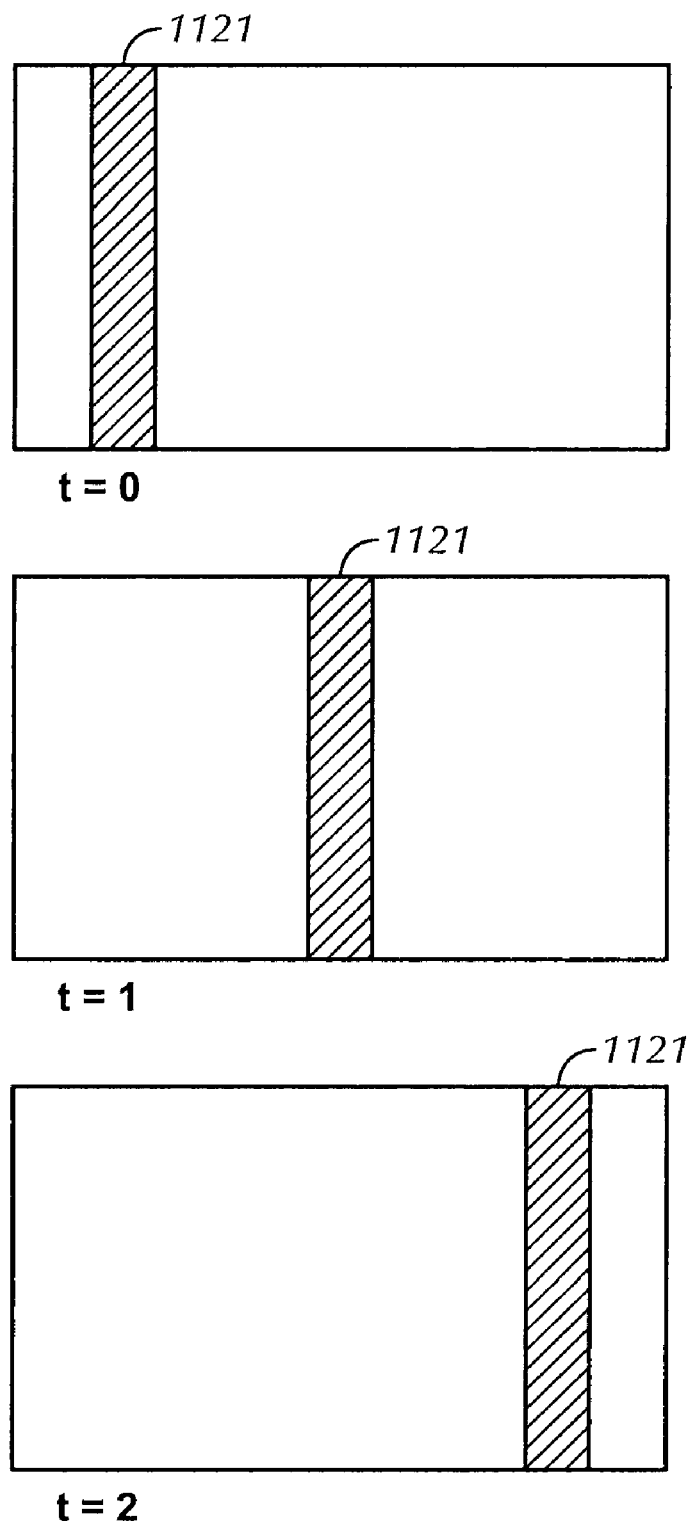
FIGS. 12A-E each shows three top views taken along the z-axis of the substrate at progressively increasing times during the second stage to illustrate various ways in which pressure region can change depending on the different configurations of the lamination system according to embodiments of the invention.

Referring to FIG. 12A, if both holders are formed of rigid materials and have constant, single-axis curvature (i.e., cylindrical curvature as shown in FIGS. 11A and 11B), the curvature of upper holder 1111 is greater than the curvature of lower holder 1103, and an even force is applied through the gimbal such that upper holder 1111 rolls across lower holder 1103 and applies a constant pressure during the second stage, then the size and shape of pressure region 1121 will remain substantially constant, but the position of pressure region 1121 will move along the lamination surfaces as shown in FIG. 12A.

Figure 12B:
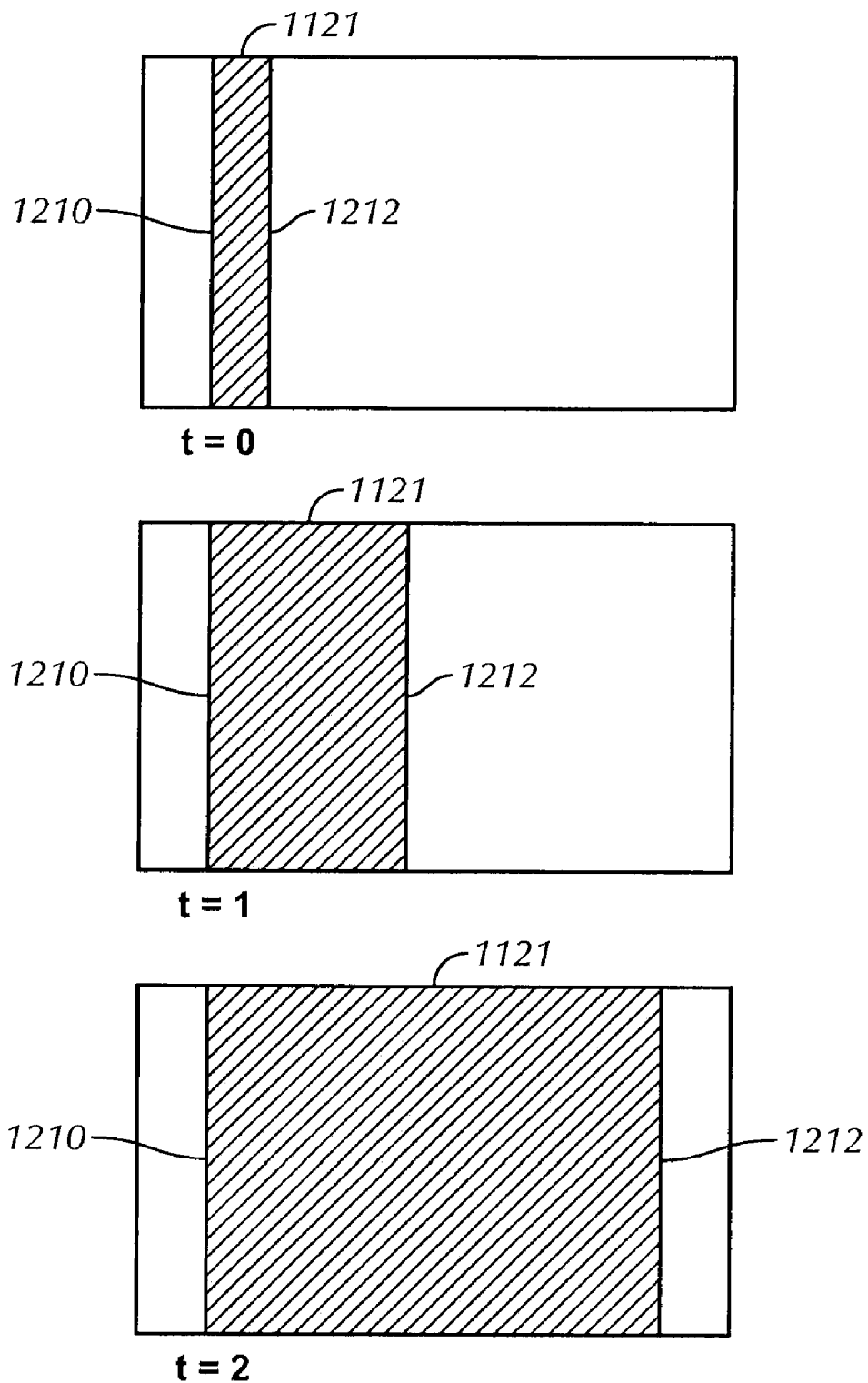

Referring to FIG. 12B, if the configuration is the same as in FIG. 12A, except that the curvature of upper holder 1111 is the same as the curvature of lower holder 1103, the size of pressure region 1121 will increase, but the type of shape will remain roughly rectangular. As illustrated, in this embodiment, the aspect ratio of the rectangular shape will change. The position of one side 1210 of the rectangle will remain substantially fixed while the position of the opposite side 1212 will move farther away as shown in FIG. 12B.

Figure 12C:
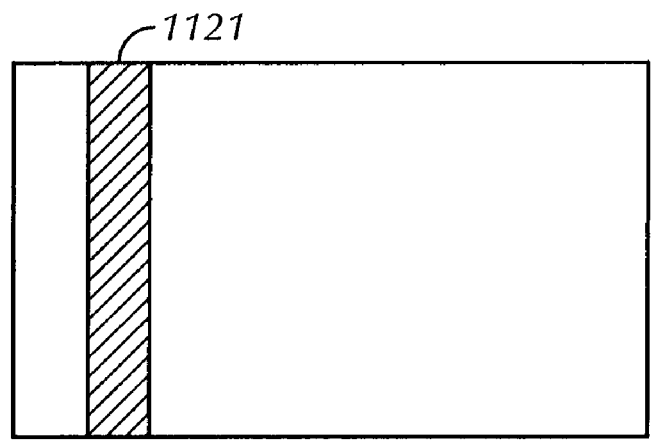
Figure 12C:
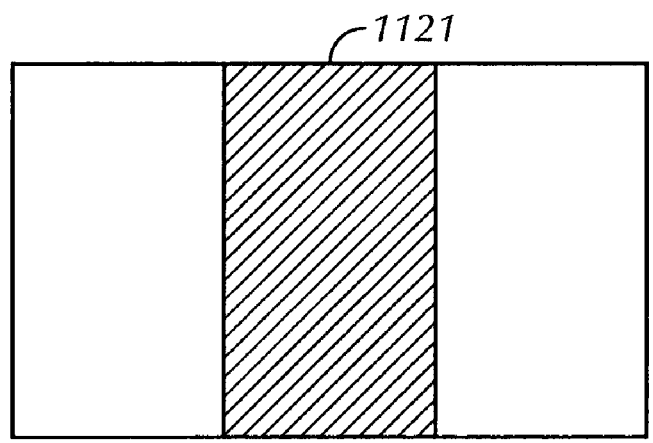
Figure 12C:
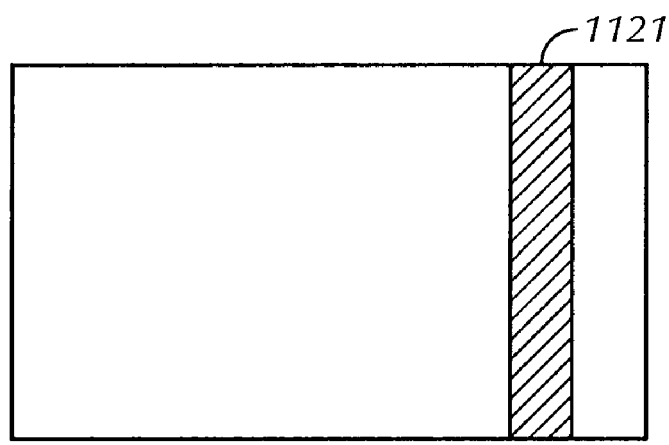

Referring to FIG. 12C, the configuration of the lamination system is the same as in FIG. 12A, except that one or both of the holders is formed of a compliant material and the force along the z-axis towards the lower holder 1103 is constantly increased through gimbal 1113 during the first half of the second stage and then constantly decreased during the last half of the second stage. As the result, the size of pressure region 1121 will increase in the first half of the second stage and decrease in the last half of the second stage, the shape of the pressure region 1121 remains rectangular though the aspect ratio will change, and the position will move along the lamination surfaces as shown in FIG. 12C.

Figure 12D:
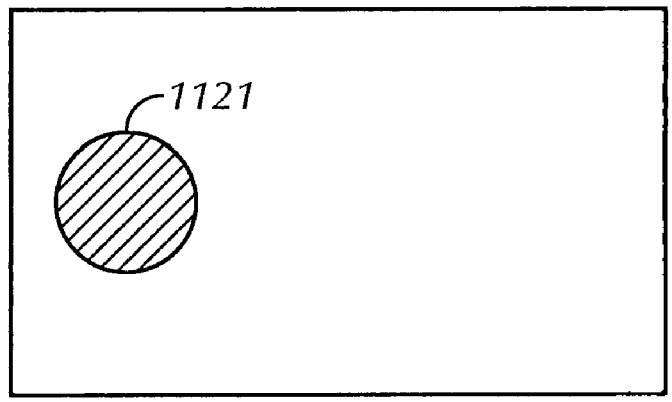
Figure 12D:
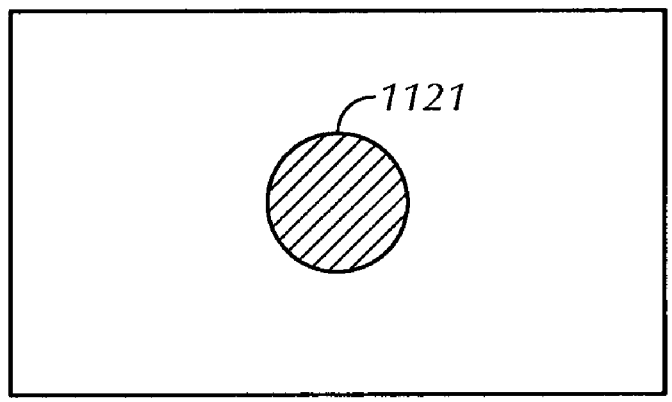
Figure 12D:
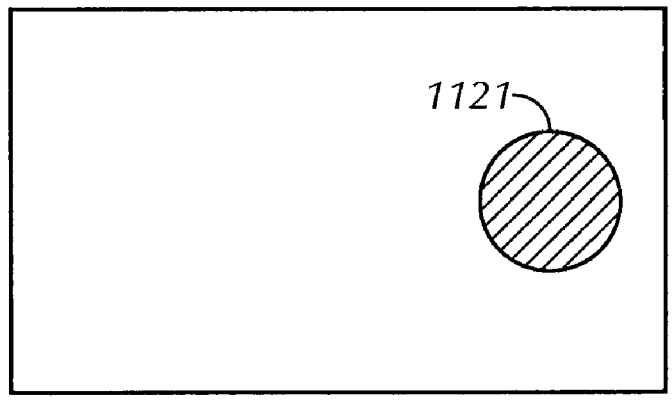
Figure 12E:
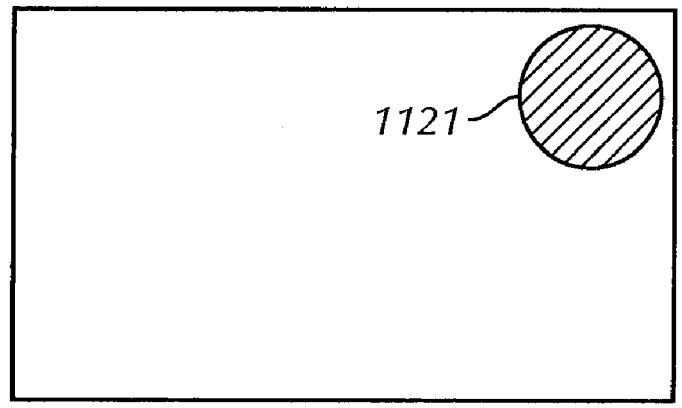
Figure 12E:
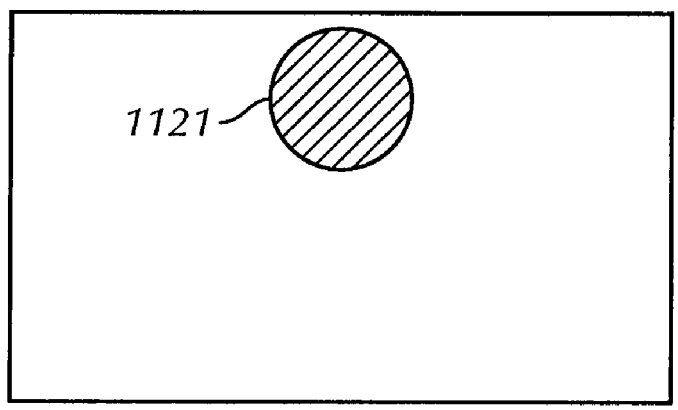
Figure 12E:
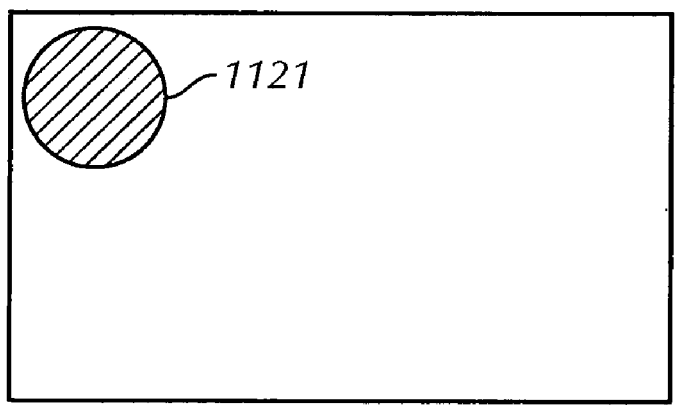
Figure 13B:
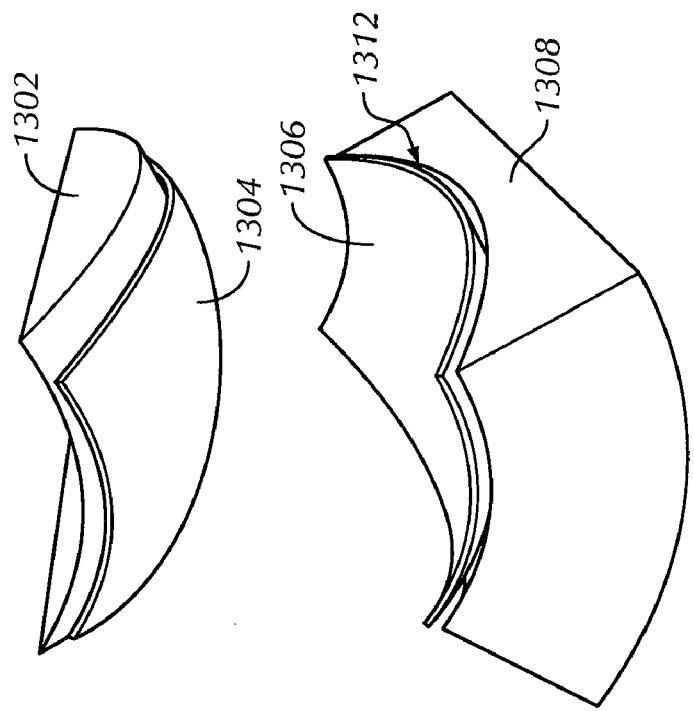
FIGS. 13A and 13B illustrate a substrate and flexible material with multi-axis curvatures according to embodiments of the invention.
Figure 13A:
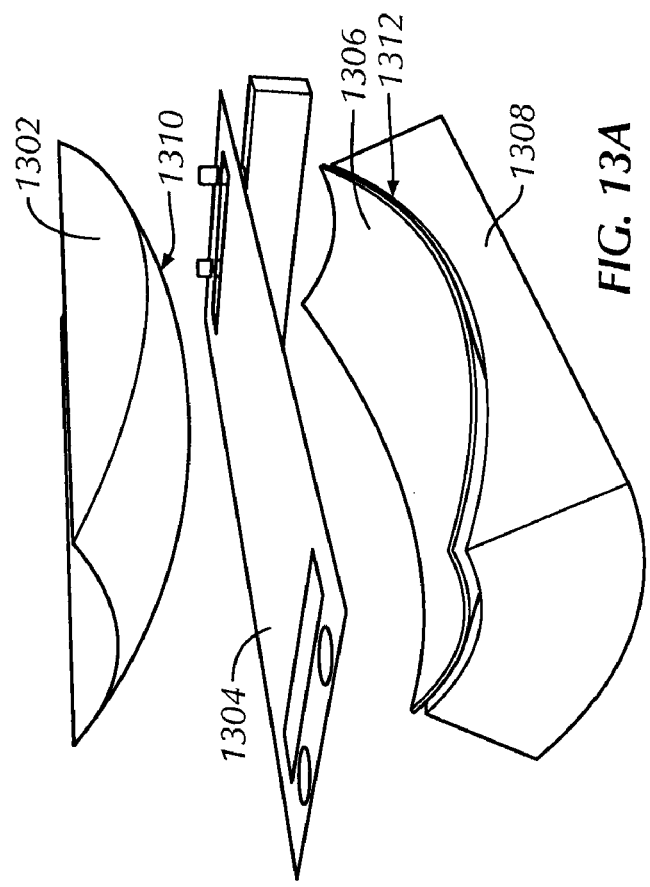

Referring to FIG. 12D, the configuration of the lamination system used here is the same as in FIG. 12A, except that both holders have constant, multi-axis curvature (e.g., curvature along the x-axis and the y-axis as shown in FIGS. 13A and 13B), and the upper holder 1111 has greater curvature than the lower holder 1101 in both axes. As the result, the size and shape of the pressure region 1121 remains fairly constant throughout the second stage and the position of the pressure region 1121 may change as shown in FIG. 12D.

As is apparent in FIG. 12D, the entire area of the lamination surfaces may not be exposed to the pressure region 1121 in the single pass of upper holder 1111. This is different from the configurations of FIGS. 12A-12C which covers the entire lamination surfaces in a single pass. Therefore, it may be desirable to drive the upper holder 1111 through additional motion to cover the entire lamination surface. For example, the gimbal 1113 could provide an additional rotation motion around the x-axis to roll the upper holder 1111 to one side, and then provide a motion substantially reverse of the previous motion, resulting in the pressure region changes shown in FIG. 12E.

In all the configurations described above, the substrate curvature is not limited to single axis (cylindrical curvature). Arbitrary multi-axis curvature may be supported by any of these configurations. FIG. 13A shows a variation of the lamination system of FIG. 11A. As illustrated, both the upper holder 1302 and the lower holder 1308 have contact surfaces 1310, 1312 that have multi-axis curvature. In various embodiments, the curvature of the upper contact surface 1310 may or may not be the same as the curvature of the lower contact surface 1312. As illustrated in FIG. 13B, the curved substrate 1306 is fixed to the lower holder 1308 and substantially adapts the curvature of the lower contact surface 1312 of the lower holder 1308. Similarly, the flexible material 1304 may conform to the curvature of the upper contact surface 1310 of the upper holder 1302.

Figure 14A:
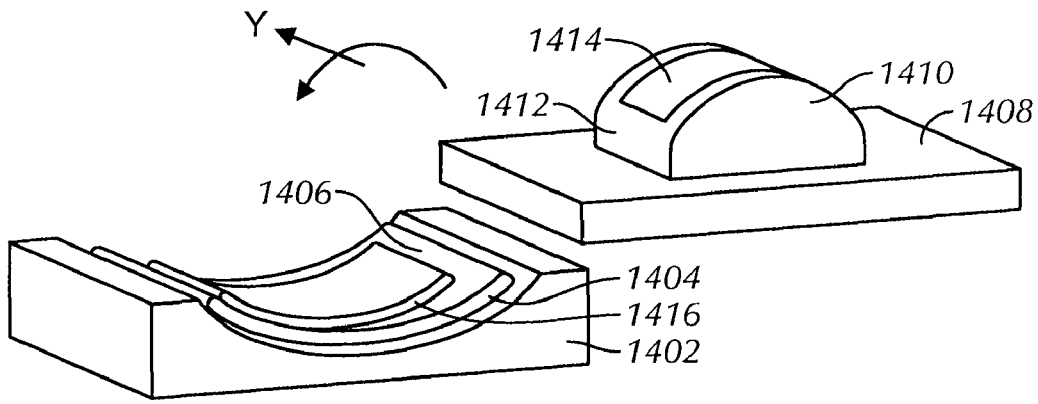
FIGS. 14A-D illustrate the operation of a lower holder and an upper holder of another exemplary lamination system according to embodiments of the invention.

FIGS. 14A-D illustrate the operation of a lower holder and an upper holder in a side-to-side lamination process according to another embodiment of the invention. This embodiment shares some of the features of the embodiments illustrated in FIGS. 10A-C and FIGS. 11A-B. Referring to FIG. 14A, the system includes a base 1402 including a lower holder 1404 with a lower contact surface 1406. A bottom substrate 1416 is held by the lower holder 1404 by a vacuum chuck (not shown) or mechanical features of the lower holder 1404. The system also includes an upper portion, for example, a press 1408. The upper portion has affixed to it an upper holder 1410. In this embodiment, the upper holder 1410 has a flexible membrane 1412 adapted to hold a top substrate 1414 in a pre-form position. In various embodiments, the top substrate 1414 may be held by a vacuum chuck (not shown) or other mechanical features of the upper holder 1410. The membrane 1412 may be a conformal material (e.g., silicone rubber) or a liquid or air filled sac. As illustrated in FIG. 14A, prior to the start of the lamination process, the press/upper holder 1408, 1410 and the base/lower holder 1402, 1406 are positioned like an open book, where the press/upper holder 1408, 1410 is the "book cover" and the base/lower holder 1402, 1406 is the rest of the book. The press 1408 and the base 1402 may or may not be in contact with each other. Both the top substrate 1414 and the bottom substrate 1416 are held on top of their respective holders 1410, 1404. The left edge of the press 1408 is approximately aligned with the right edge of the base 1402 so that when the upper holder 1410 rotates counter clockwise about the y-axis, the upper substrate 1414 can be in position to make contact with the bottom substrate 1416 and become laminated to the bottom substrate 1416.

Figure 14B:
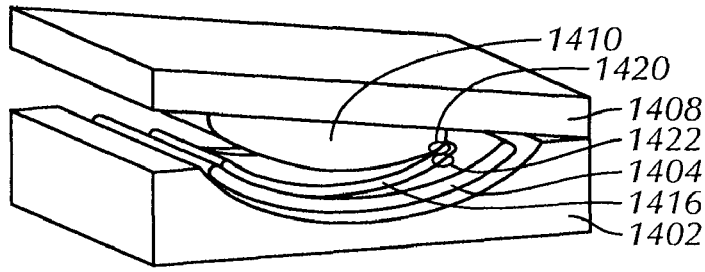

Referring to FIG. 14B, as the upper portion rotates about the y-axis, a first portion 1420 of the upper substrate 1414 initially comes into contact with a first portion 1422 of the bottom substrate 1416. A pressure region (not shown) is formed at the initial point of contact between the first portion 1420 of the upper substrate 1414 and the first portion 1422 of the bottom substrate 1416. After the initial contact, the upper portion continues to rotate about the y-axis, causing the pressure region to change in size, shape, and/or position. How the pressure region changes can depend on several factors, such as the shapes and rigidity of the upper and lower holders, the type and amount of force/motion applied to by the press during operation, and other factors. In various embodiments, the pressure region may change, for example, as illustrated in FIGS. 12A-12E.

Figure 14C:
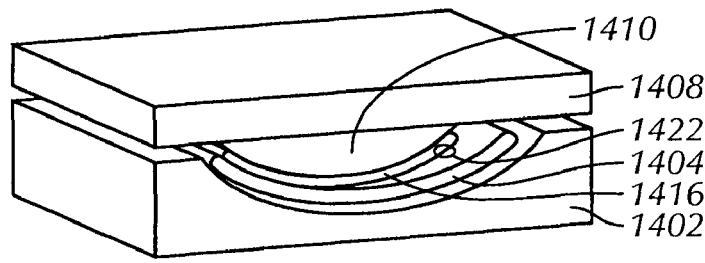

FIG. 14C illustrates a stage in which the side-to-side lamination process is at approximately its halfway point where the press 1408 and the base 1402 are substantially parallel to each other and the upper holder 1410 is in contact and applying pressure to the center region of the lower holder 1404. Because the adhesion force between the first portion 1420 of the upper substrate 1414 and the first portion 1422 of the bottom substrate 1416 is higher than the holding force between the upper holder 1410 and the upper substrate 1414, the first area 1420 of the upper substrate 1414 in FIG. 14B is now detached from the upper holder 1410 and laminated to the first area 1422 of the bottom substrate.

Figure 14D:
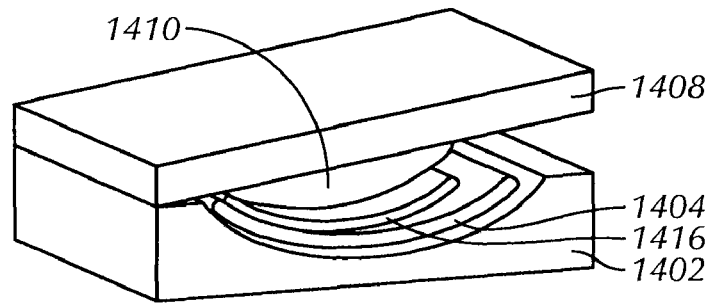

FIG. 14D illustrates the final stage of the side-to-side lamination process. As illustrated, the upper portion continues to rotate about the y-axis from where it was in FIG. 14C. The center portion of the upper substrate 1414 is now detached from the upper holder and laminated to the center portion of the lower substrate 1416. The pressure region has shifted beyond the center of the lower holder 1404 and reached the other side of the lower holder 1410. This allows the upper substrate 1414 to be completely laminated to the bottom substrate 1422. In this embodiment, pressure is applied evenly in all directions by the nature of the material that forms the membrane.

The system of FIGS. 14A-D may be overturned and the above described side-to-side lamination process may be repeated in the opposite direction to make sure that the substrates are completed laminated and rid of any air bubbles that remains between the substrates.

Figure 15:
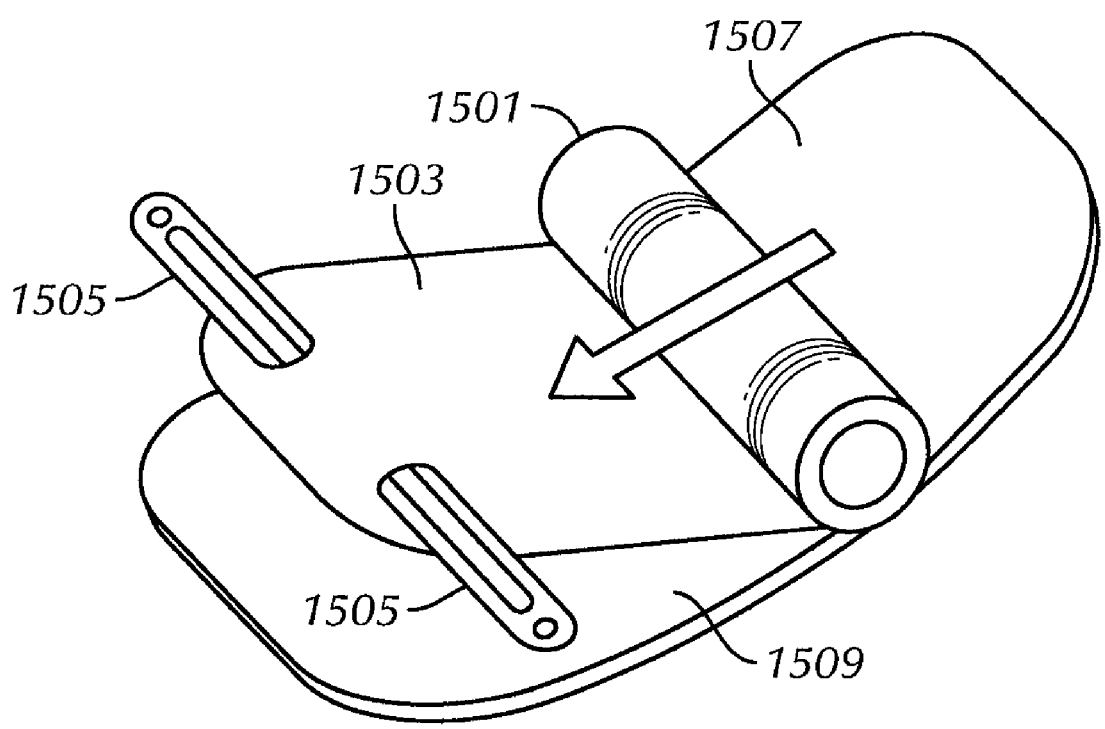
FIG. 15 illustrates the operation of an upper holder of another exemplary lamination system according to embodiments of the invention.

FIG. 15 illustrates the operation of an upper holder of another exemplary lamination system according to embodiments of the invention. In this system, an upper holder 1501 is substantially cylindrical and is formed of a compliant material such as rubber. For the sake of clarity, a lower holder is not illustrated. FIG. 15 also shows a flexible material 1503 held at one end by grippers 1505. The flexible material 1503 may include detachable tabs (not shown) to be held by the grippers in some embodiments. During a lamination operation, upper holder 1501 rolls across a non-lamination surface 1509 of the flexible material 1503 to press the flexible material 1503 and a multi-axis curved substrate 1509 together. As upper holder 1501 rolls across flexible material 1503, the upper holder 1501 deforms to conform to the shape of the substrate 1509. During the lamination process, the grippers 1505 may, for example, hold a fixed portion of the flexible material 1503, such as an edge portion or the detachable tabs. In another embodiment, the grippers 1505 may slide along the surface of flexible material 1503 while providing enough resistance to reduce slack in the unattached portion of the flexible material 1503.

Figure 16:
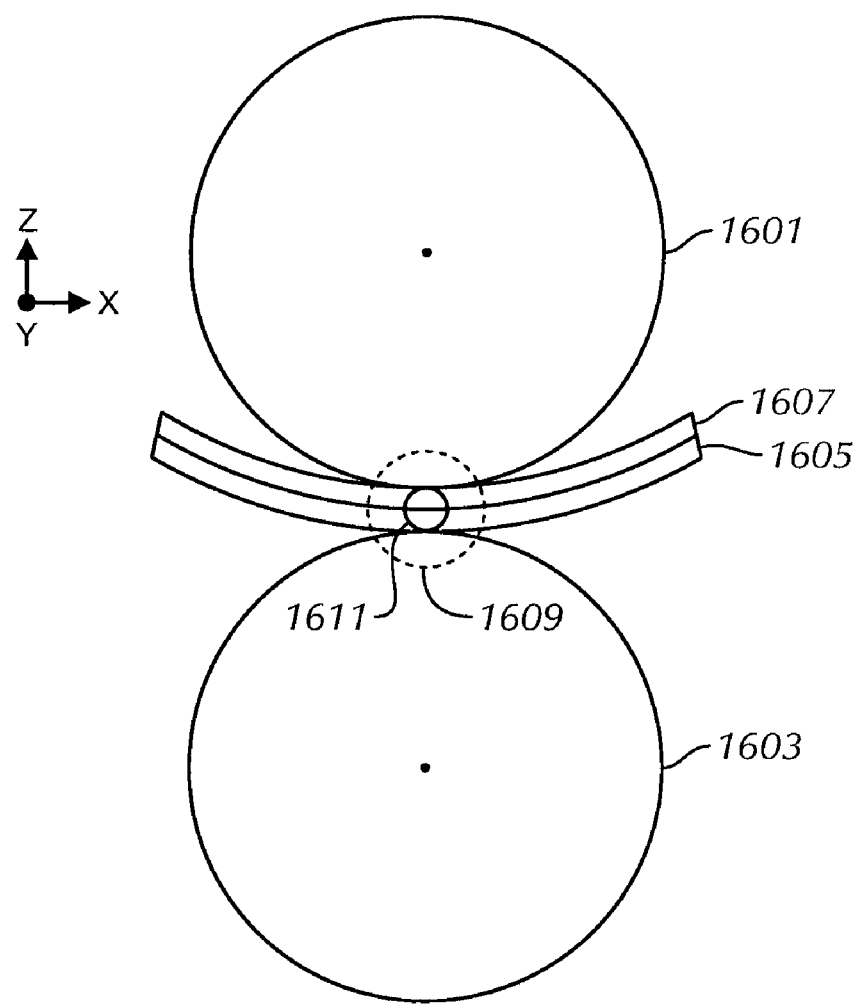
FIGS. 16-18 illustrate the operation of a lower holder and an upper holder of another exemplary lamination system according to embodiments of the invention.
Figure 17:
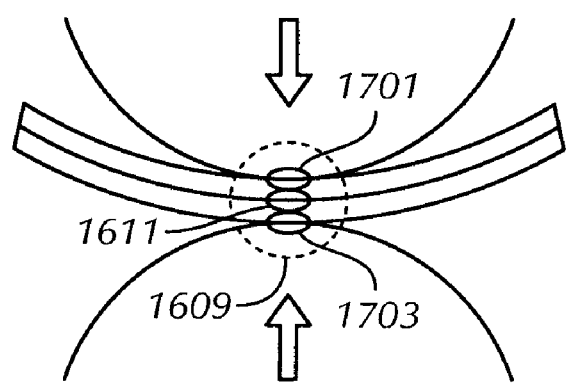
Figure 18:
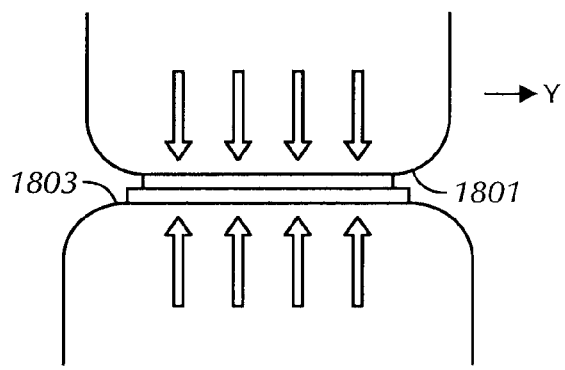

FIGS. 16-18 illustrate the operation of a lower holder and an upper holder of another exemplary lamination system according to embodiments of the invention. Referring to FIG. 16, this system includes an upper holder 1601 and a lower holder 1603 that are substantially cylindrical wheels that can rotate about an axis. Note that diameter of one or both wheels may be chosen based on the curvature of the substrate 1605. Each holder is formed of a compliant material, such as rubber, foam, a flexible air- or fluid-filled bag, etc. A curved substrate 1605 and a flexible material 1607 are fed in as the holders 1601, 1603 rotate in opposite directions to grab the substrate 1605 and the flexible material 1607 and pull them into a working space 1609 between the upper holder 1601 and the lower holder 1603. In the working space 1609, the upper holder 1601 and the lower holder 1603 exert opposing forces on the flexible material 1607 and the curved substrate 1605, respectively, which causes the formation of a pressure region 1611 where lamination occurs. The portion of the flexible material 1607 in the working space is forced to be conformed to the upper holder 1601 and, as a result of the forces, any air bubbles between the flexible material 1607 and the curved substrate 1605 are pushed out.

FIG. 17 illustrates a more detailed view of the working space 1609. In particular, FIG. 17 shows the opposing force-applying areas 1701 and 1703 of flexible material 1701 and substrate 1703, respectively. As seen in FIG. 17, it may be possible to make the pressure region 1611 a small size, which may allow for a greater pressure to be applied in the pressure region 1611 while reducing the chance of breakage of the lamination material. This may be particularly useful in the case that the lamination materials are delicate, for example, if curved substrate 1605 is made of glass. FIG. 18 is a front view illustrating that rolling surfaces 1801 and 1803 of the upper holder 1601 and the lower holder 1603 are deformable and can conform to the shape of the laminate materials along the y-axis.

Figure 19:
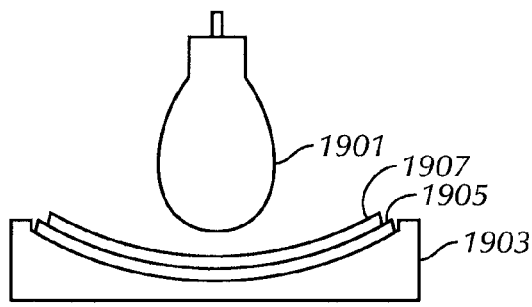
FIGS. 19-21 illustrate the operation of a lower holder and an upper holder of yet another exemplary lamination system according to embodiments of the invention.
Figure 20:
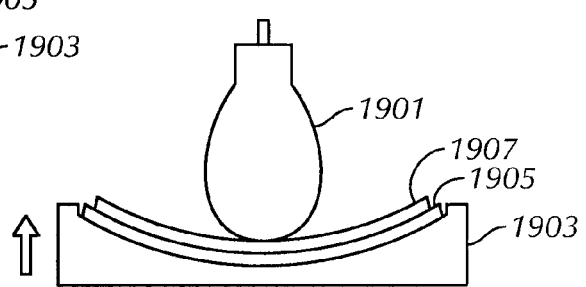
Figure 21:
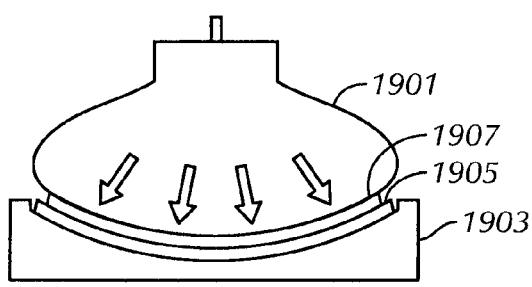

FIGS. 19-21 illustrate the operation of a lower holder and an upper holder of another exemplary lamination system according to embodiments of the invention. Referring to FIG. 19, this system includes an upper holder 1901 that is formed of a hollow, expandable bag or balloon, and a lower holder 1903 that is a rigid base. A curved substrate 1905 is placed on lower holder 1903 with a non-lamination surface of the substrate in contact with the lower holder 1903. A flexible material 1907 is placed on the curved substrate 1905 with a non-lamination surface exposed to upper holder 1901. A pump (not shown) is coupled to the upper holder 1901 to pump, for example, air into and out of the upper holder 1901, so that the upper holder 1901 can be made to expand and contract.

FIG. 20 shows the beginning of a lamination process of the system of FIG. 19. The upper holder 1901, which is not inflated, is moved along z-axis towards lower holder 1903 until the surface of upper holder 1901 pitch contact with the non-lamination surface of flexible material 1907. Once contact is made, the upper holder 1901 stops moving in the z-axis. The pump (not shown) coupled to the upper holder is turned on to inflate the upper holder 1901 by pumping air into the upper holder 1901. As shown in FIG. 21, the shape of the upper holder 1901 changes as it inflates, such that a pressure region is first formed at the point of first contact and then expands outward in a substantially radial direction towards the perimeter of the flexible material 1907. This can cause air to be forced from the center to the perimeter of the laminate, helping to eliminate air bubbles in and/or surrounding the pressure region.

Figure 22:
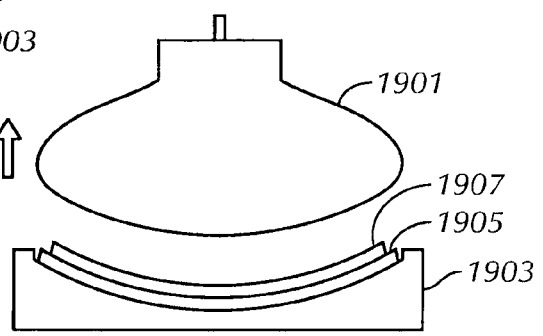
FIG. 22 illustrates the operation of a lower holder and an upper holder of yet another exemplary lamination system according to embodiments of the invention.

FIG. 22 illustrates the operation of a lower holder and an upper holder of another example lamination system according to embodiments of the invention. The system shown in FIG. 22 is similar to the system shown in FIGS. 19-21. However, upper holder 1901 is inflated with gas or liquid before it is moved into contact with flexible material 1907. Once upper holder 1901 is inflated, it is lowered into contact with flexible material 1907. The motion continues downward after contact, deforming upper holder 1901 and creating a pressure region that increases in size from the initial contact point radially outward towards the perimeter. Note, while the upper holder 1901 is moving downward in contact with the flexible material 1907, air or gas may or may not be pumped into or out of the upper holder 1901. In other words, the degree of inflation of the upper holder 1901 may be increased or decreased while it is moving in contact with the flexible material 1907.

FIGS. 23A-B, 24A-C, and 25 illustrate various example alignment structures that can be used to help align a flexible material 2301 when placing the flexible material 2301 onto a curved substrate 2303. FIGS. 23A-B are perspective views showing the flexible material 2301 formed with break off tabs 2305 for alignment. In this embodiment, break off tabs 2305 extend from the periphery of the flexible material 2301 and have holes that can be fit over alignment pins (not shown) to help with alignment. In another embodiment, the holes of break off tabs 2305 can be used to visually align the flexible material 2301 by matching the holes with fiducials, markers, such as dots or X's (not shown).

FIGS. 24A-C show the alignment holes 2401 in the flexible material 2301 that allow for visual alignment of the flexible material 2301 using fiducials on the substrate 2303. FIGS. 24A and 24B show two different full views of the flexible material, and FIG. 24C shows a magnified view of a hole 2401 aligned with a fiducial 2402 on the substrate 2303.

FIG. 25 shows another layout of alignment holes. As illustrated, the alignment holes 2501 in the flexible material 2301 are an opposite ends of the flexible material 2301.

Figure 26:
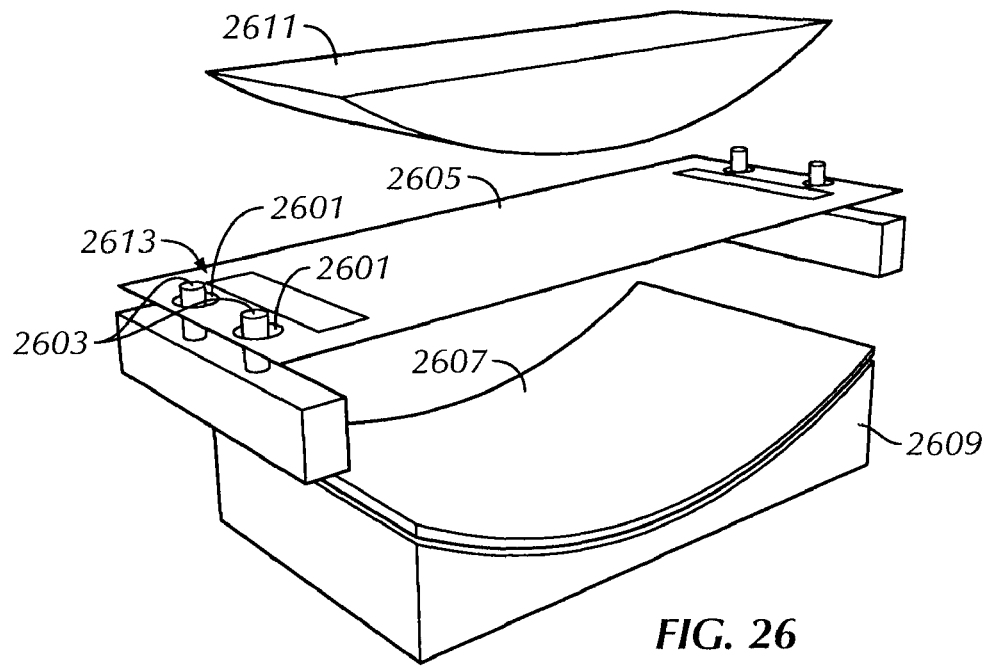
FIG. 26 is a perspective view illustrating a 2-step process for laminating a printed circuit board (PCB) to a curved substrate according to embodiments of the invention.

FIG. 26 is a perspective view illustrating a 2-step process for laminating a PCB 2605 to a curved substrate 2607, and then laminating a stiffener to the PCB back. First, alignment holes 2601 are placed over alignment pins 2603 to align the PCB 2605 with a glass, curved substrate 2607. The substrate 2607 is held in position against a base 2609 using vacuum holes (not shown). In a first step of a lamination process, an upper holder 2611 is moved along the z-axis in the direction towards the base 2609. After making contact with the PCB 2605, the upper holder 2611 continues moving towards the base 2609. This movement causes the PCB 2605 to break away from the break away tabs 2613 and become laminated onto the substrate 2607.

Figure 27:
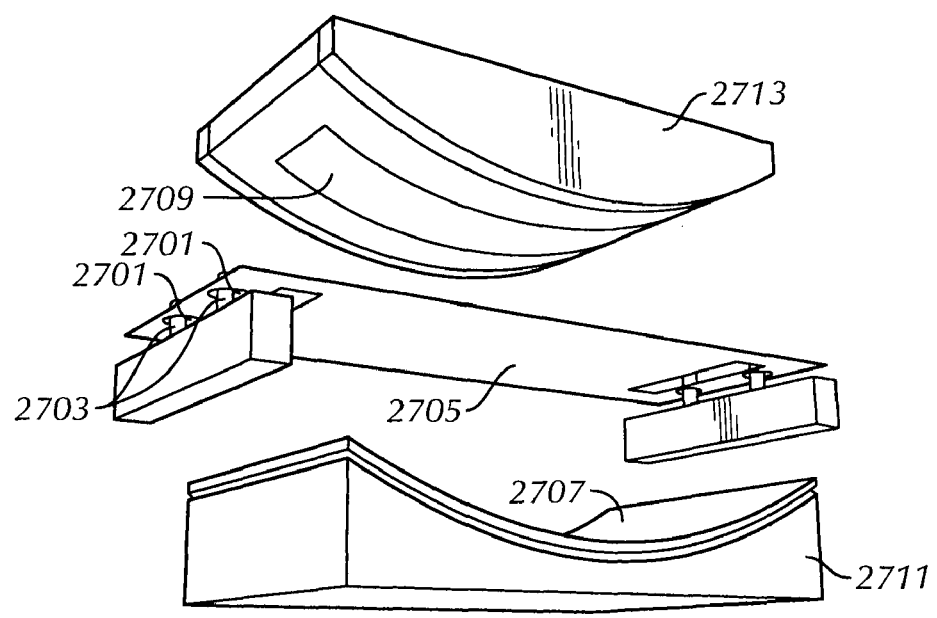
FIG. 27 is a perspective view illustrating a 1-step process for laminating a PCB to a curved substrate.

In a second step of the lamination process, a stiffener (not shown) is placed onto the exposed PCB 2605 surface, and pressed downward by the upper holder 2611 to be laminated to the PCB/glass laminate. The stiffener may be a rigid material with a curvature that matches the curvature of the substrate 2607, FIG. 27 is a perspective view illustrating a 1-step process for laminating a PCB 2705 to a glass curved substrate 2707, while at the same time laminating a stiffener 2709 to the PCB back. As in the embodiment shown in FIG. 26, the alignment holes 2701 are placed over alignment pins 2703 to align the PCB 2705 with the glass curved substrate 2707. The substrate 2707 is held in position against a base 2711 using vacuum holes (not shown). In this system, the stiffener 2709 is held to the upper holder 2713 by, for example, vacuum holes (not shown). In one example embodiment, the stiffener 2709 may be fit into a negative cutout of the upper holder 2713. Therefore, as the upper holder 2713 moves downward towards the base 2711, and the upper holder presses the PCB 2705 together with substrate 2707, the upper holder 2713 is also pressing the stiffener 2709 together with the PCB 2705. Therefore, only a single step (i.e., a single press and release motion) is needed to form a 3-layer laminate of the substrate 2707, the PCB 2705, and the stiffener 2713.

Figure 28:
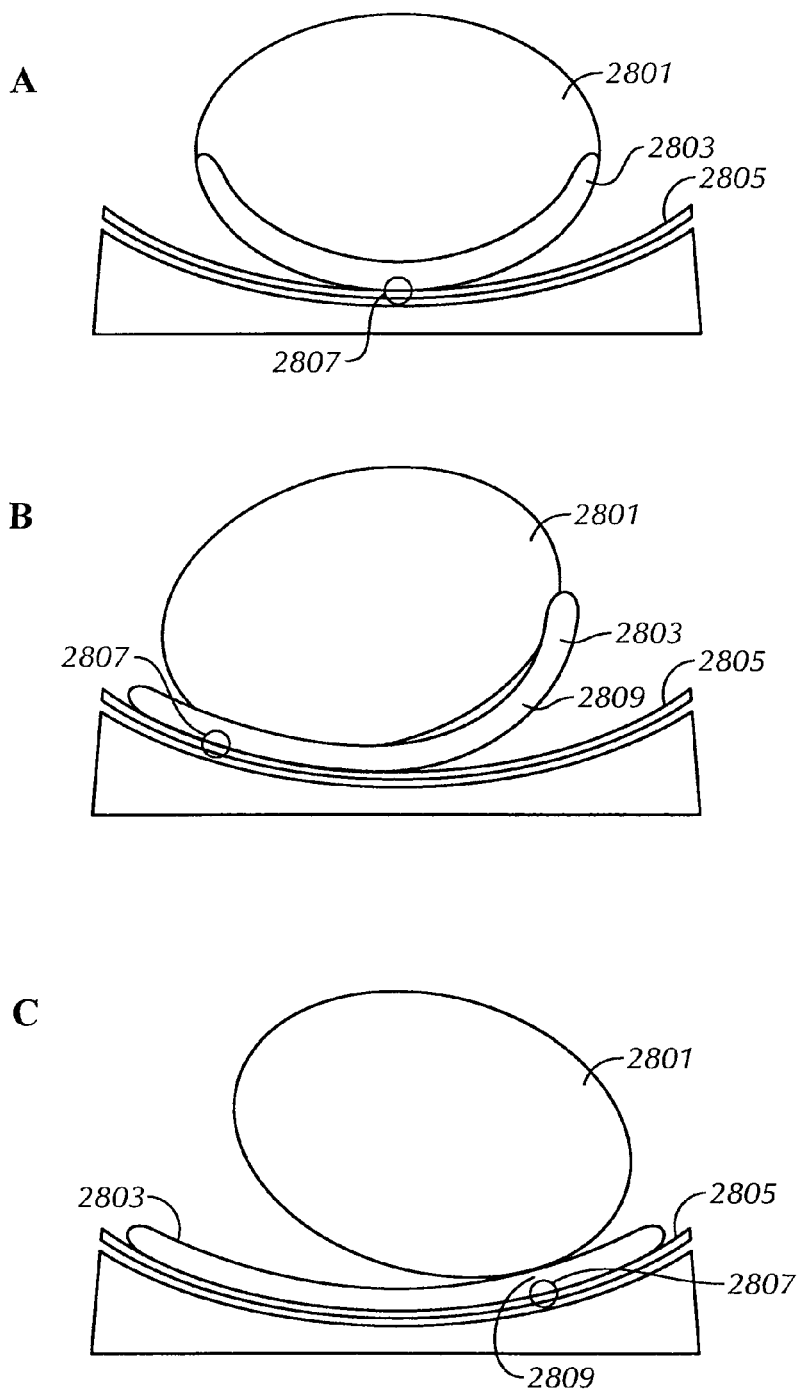
FIGS. 28A-C illustrates the operation of a lower holder and an upper holder of another example lamination system according to embodiments of the invention.

FIGS. 28A-C illustrates the operation of a lower holder and an upper holder of another exemplary lamination system according to embodiments of the invention. In particular, FIG. 28 is one example of many possible combination methods that utilize different features, configurations and processes in the previously described embodiments. The system of FIG. 28, for example, combines some aspects of the system of FIGS. 6-8 (e.g., rigid lower holder, upper holder with vacuum holes, lowering upper holder along z-axis to make contact at the center of the lower holder first) with some aspects of the system of FIGS. 11, 12, and 13A (e.g., rigid upper holder, rolling motion of upper holder in y-axis).

Referring to FIG. 28A, an upper holder 2801 having vacuum holes (not shown) that hold a flexible material 2803 is lowered along a z-axis to contact a rigid curved substrate 2805 at a center contact point. A pressure region 2807 is formed at the center contact point initially and then moved along the surface of the laminates by applying a rolling motion of the upper holder 2801. Next, as illustrated in FIG. 28B, as the rolling motion is applied in one direction, one end 2809 of the flexible material 2803 in the opposite direction begins to buckle and/or separate from the upper holder 2801. Finally, as illustrated in FIG. 28C, the upper holder 2801 rolls in the opposite direction, moving the pressure region 2807 over the buckled portion 2809 of the flexible material 2803 to complete the lamination.

By combining different aspects of embodiments, the pressure region causing lamination can be changed in many different ways to achieve the same lamination result.

Figure 29A:
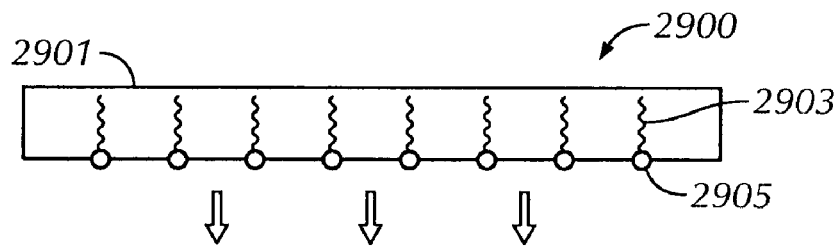
FIGS. 29A-B illustrate a post-lamination device and process according to embodiments of the invention.
Figure 29B:
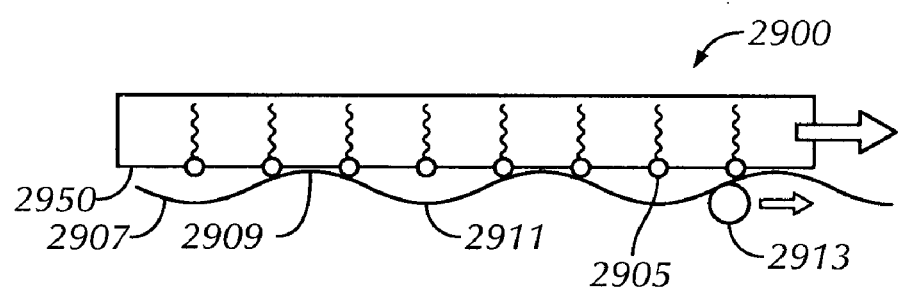

FIGS. 29A-B illustrate a post-lamination device and process according to embodiments of the invention. Referring to FIG. 29A, an example microbead surface 2900 is shown. The microbead surface 2900 includes a body 2901 in which a plurality of springs 2903 are positioned. Springs 2903 are coupled to microbeads 2905 such that an outward (direction by arrows in FIG. 29A) force is applied to each microbead. The outward forces of springs 2903 are countered by a plurality of collars (not shown) that hold the microbeads 2900 within the body 2901 while allowing a portion of the microbeads 2905 to protrude from the body 2901. Thus, the protruding portion of each microbead 2905 can apply a force that is proportional to the spring constant of its corresponding spring 2903.

FIG. 29B illustrates a post-lamination process in which the microbead surface 2950 is walked slowly over the surface of a laminate 2907. The motion can be automatic or manual. In this example, the surface of the laminate 2907 has peaks 2909 and valleys 2911 as a result of, for example, underlying conductive traces (not shown). As the microbead surface 2900 is moved across the surface, the microbeads can potentially protrude down into a valley 2911 and push an air bubble 2913 to a perimeter of the laminate 2907, thereby preventing air bubbles from being trapped in the laminate 2907. In particular, the microbead surface 2900 can be formed such that, for example, the sizes of the microbeads 2905, the distances between the microbeads 2905, and/or the pattern created by the microbead protrusion conform to an underlying conductive trace pattern, potentially increasing the efficiency of the post-lamination process. In one embodiment, the microbeads 2905 are 1 mm to 5 mm in size and are 4 mm to 10 mm apart.

Figure 30:
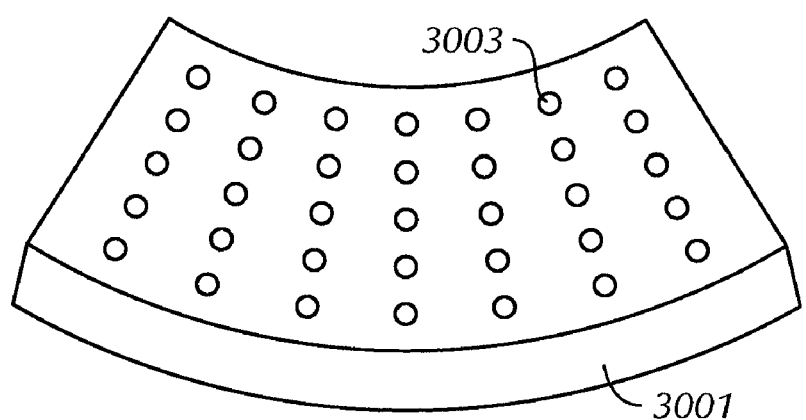
FIG. 30 illustrates a perforated substrate according to embodiments of this invention.

FIG. 30 illustrates a substrate 3201 including perforations 3203. Perforations in either or both of the substrate 3201 and the flexible material 3203 can help air bubbles escape.

As one skilled in the art would readily understand after reading the disclosure herein, various aspects of the configuration of the lamination system can be adjusted to produce many different changes in the pressure region during a lamination process. The aspects of the configuration include, but are not limited to, the size and shape of the upper and lower holders, the materials used in the holders, the adhesives used, the materials to be laminated together, the different rotational motions, such as rolls, pitches and yaws, and various translational motions along different axes, the use of multiple passes, and post-lamination processes. Furthermore, any of the foregoing processes that utilize a rigid lower holder and a rigid upper holder can be used to laminate a rigid material to a rigid curved substrate. In other words, in those example embodiments, and others that one skilled in the art would readily recognize, the material that is laminated to a rigid curved substrate need not be flexible, but may be rigid.

In addition, any of the foregoing processes may be applied in a vacuum chamber or in ambient pressure. A compliant or spring-supported layer may be added to any of the holders not explicitly listed as compliant, particularly as a method of uniformly distributing applied forces across the substrates. Also, adjustment for alignment in axes other than the z-axis (lateral dimensions x and y, as well as yaw, pitch and roll) may be added to one or both the lower and the upper holders, particularly to facilitate alignment. Lamination by any of the foregoing methods may be followed by an autoclave process, in which individual parts may or may not be placed in vacuum bags, to increase bond quality and reduce trapped bubbles. In addition, alignment pins as shown in the figures do not represent all possible locations or configurations of alignment features. Fiducials and optically assisted alignment are also supported in the forgoing processes.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An apparatus for laminating a surface of a flexible material to a surface of a curved material, the apparatus comprising:
    a first holder configured for contacting the flexible material;
    a second holder configured for contacting the curved material;
    a support holder having a plurality of alignment pins for supporting the flexible material as a flat surface spaced apart from a contact surface of the first holder and the curved material;
    a pressure applying device configured for pressing the first holder against the flexible material to cause the flexible material to press against the curved material at a first portion of the flexible material at a pressure region between the surface of the flexible material and the surface of the curved material;
    articulation means for shifting the first holder across the flexible member, the articulation means causing translation of the first holder along both an x and y direction while moving the first holder toward the second holder along a z direction, thus changing at least the position of the pressure region to laminate the flexible material to the curved material and remove air bubbles between the laminated flexible material and the curved material.

2. The apparatus of claim 1, wherein the flexible material is a substantially planar circuit board.

3. The apparatus of claim 1, wherein the flexible material comprises a plurality of conductive traces on its surface and an insulating layer deposited over the conductive traces.

4. The apparatus of claim 1, wherein the laminated flexible material and the curved material are a part of a sensor array, and the sensor array is a part of a multi-touch mouse.

5. The apparatus of claim 1, further comprising an adhesive adapted to laminate the flexible material and the curved material, the adhesive selected from a group consisting of pressure-sensitive adhesives (PSAs), re-workable PSAs, thermoplastic film, thermoset film, thermal cure liquid, UV curing liquid, and multiple-component adhesives.

6. The apparatus of claim 1, wherein the support holder is part of the second holder.

7. The apparatus of claim 1, wherein the first holder is made of a deformable material.

8. The apparatus of claim 1, wherein the pressure applying device is adapted to change an amount of pressure applied to the surface of the flexible material and the surface of the curved material.

9. The apparatus of claim 1, wherein the change of the pressure region is in response to a shape of at least one of the first holder and the second holder.

10. The apparatus of claim 1, wherein the articulation means comprising a gimbal adapted to control movement of the first holder and create a rolling motion of the first holder.

11. The apparatus of claim 1, further comprising a microbead surface adapted to be walked over the flexible material to remove air bubbles between the laminated flexible material and the curved material.

12. The apparatus of claim 11, wherein the flexible material has a conductive trace pattern and microbeads on the microbead surface have a size and spacing to conform to the conductive trace pattern.

13. The apparatus of claim 12, wherein the conductive trace pattern has a plurality of peaks and valleys and the microbeads protrude into the valleys to push air to a perimeter of the laminated flexible material and the curved material during walking.

14. The apparatus of claim 1, wherein break away tabs secure the flexible material to the alignment pins, the break away tabs configured to detach the flexible material from the alignment pins under pressure.

15. The apparatus of claim 14, further comprising a microbead surface adapted to be walked over the flexible material to remove air bubbles between the laminated flexible material and the curved material.

16. The apparatus of claim 15, wherein the flexible material has a conductive trace pattern and microbeads on the microbead surface have a size and spacing to conform to the conductive trace pattern.

17. The apparatus of claim 16, wherein the conductive trace pattern has a plurality of peaks and valleys and the microbeads protrude into the valleys to push air to a perimeter of the laminate during walking.

* * * * *